(12) United States Patent
Kuma et al.

(10) Patent No.: US 11,227,436 B2
(45) Date of Patent: Jan. 18, 2022

(54) INFORMATION PROCESSING APPARATUS AND INFORMATION PROCESSING METHOD

(71) Applicant: SONY CORPORATION, Tokyo (JP)

(72) Inventors: Satoru Kuma, Tokyo (JP); Ohji Nakagami, Tokyo (JP); Koji Yano, Tokyo (JP); Tsuyoshi Kato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/960,256

(22) PCT Filed: Jan. 7, 2019

(86) PCT No.: PCT/JP2019/000050
§ 371 (c)(1),
(2) Date: Jul. 6, 2020

(87) PCT Pub. No.: WO2019/142665
PCT Pub. Date: Jul. 25, 2019

(65) Prior Publication Data
US 2021/0065445 A1    Mar. 4, 2021

(30) Foreign Application Priority Data
Jan. 16, 2018 (JP) .............................. JP2018-004667

(51) Int. Cl.
*G06T 17/10* (2006.01)
*G06T 9/00* (2006.01)

(52) U.S. Cl.
CPC .............. *G06T 17/10* (2013.01); *G06T 9/00* (2013.01); *G06T 2210/12* (2013.01); *G06T 2210/56* (2013.01)

(58) Field of Classification Search
None
See application file for complete search history.

(56) References Cited

U.S. PATENT DOCUMENTS

2016/0267705 A1* 9/2016 O'Leary ................. G06T 13/20
2020/0320685 A1* 10/2020 Anssari Moin ....... G06T 11/008

FOREIGN PATENT DOCUMENTS

| CN | 107567642 A | 1/2018 |
| JP | 11-039512 A | 2/1999 |

(Continued)

OTHER PUBLICATIONS

Mekuria, et al., "Design, Implementation and Evaluation of a Point Cloud Codec for Tele-Immersive Video", Transactions on Circuits and Systems for Video Technology, IEEE, vol. 27, No. 4, Apr. 2017, 14 pages.

(Continued)

*Primary Examiner* — Nurun N Flora
(74) *Attorney, Agent, or Firm* — Chip Law Group

(57) ABSTRACT

The present disclosure relates to an information processing apparatus and an information processing method capable of suppressing a reduction in quality of rendering results. Rendering is performed on voxel data that is 3D data obtained by quantizing position information using voxels and representing a three-dimensional structure in response to a shape of each of the voxels. Alternatively, rendering is performed on voxel data that is 3D data obtained by quantizing position information using voxels and representing a three-dimensional structure on the basis of rendering information that is information related to the rendering of the voxel data. The present disclosure is applicable to, for example, an information processing apparatus, an image processing apparatus, an electronic apparatus, an information processing method, a program, and the like.

19 Claims, 20 Drawing Sheets

(56) References Cited

FOREIGN PATENT DOCUMENTS

| JP | 2008-262493 A | 10/2008 |
| JP | 2018-514885 A | 6/2018 |
| WO | 2016/142787 A1 | 9/2016 |

OTHER PUBLICATIONS

International Search Report and Written Opinion of PCT Application No. PCT/JP2019/000050, dated Mar. 19, 2019, 08 pages of ISRWO.

Mekuria, et al., "Design, Implementation and Evaluation of a Point Cloud Codec for Tele-Immersive Video", Transactions on Circuits and Systems for Video Technology, IEEE, vol. 27, No. 4, Apr. 2017, pp. 828-842.

* cited by examiner

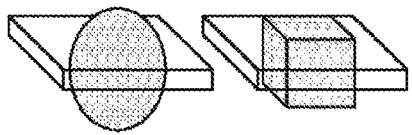
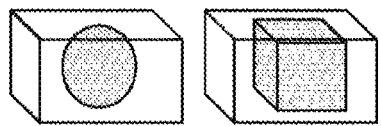
FIG. 3B
FIG. 3D
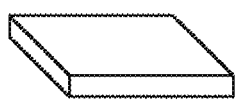
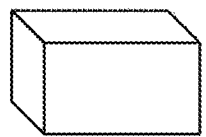
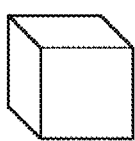
FIG. 3A
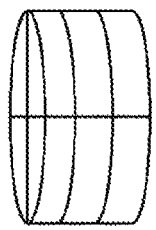
FIG. 3C

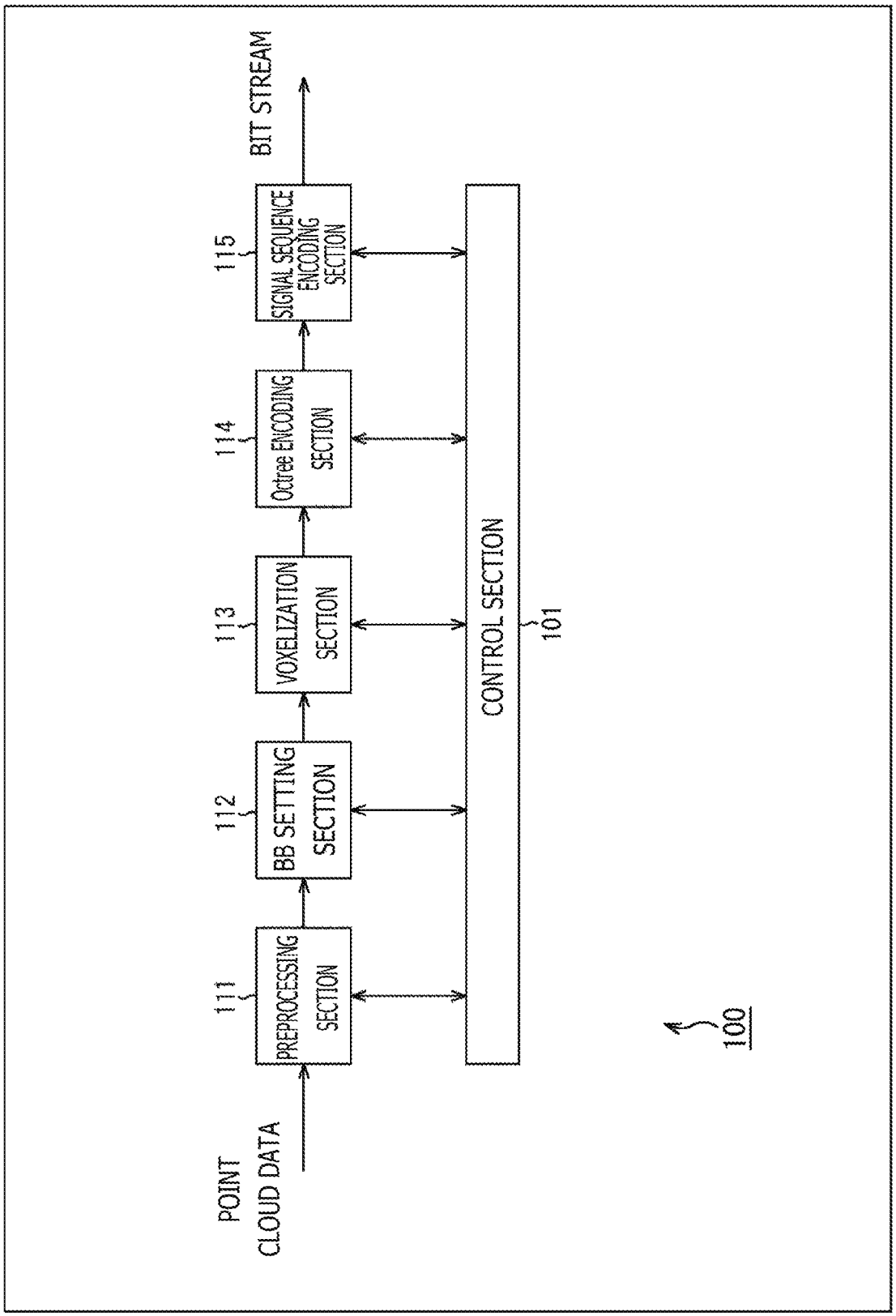

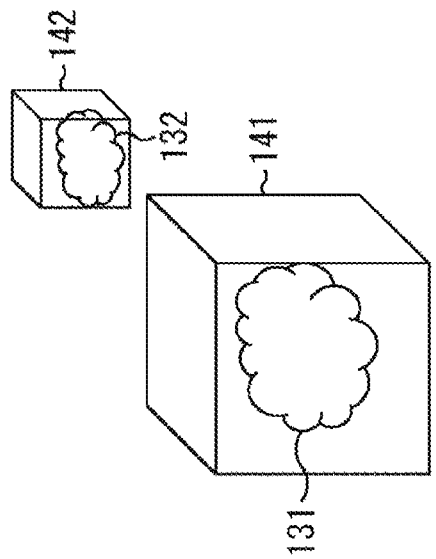
FIG. 5A
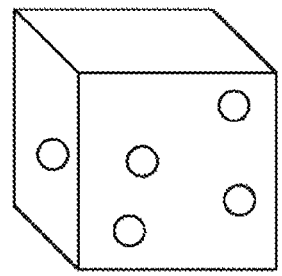
FIG. 5B
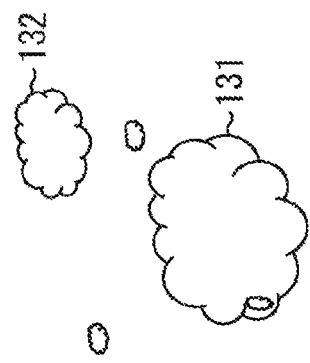
FIG. 5C
FIG. 5D

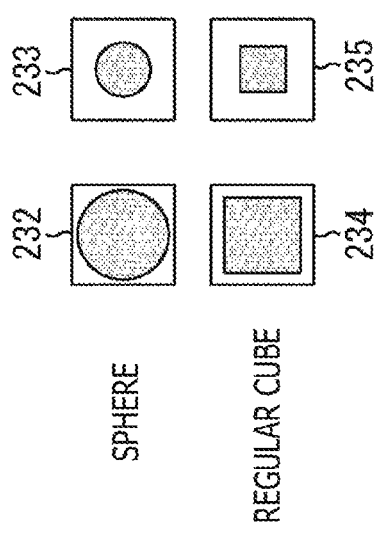
FIG. 9A
FIG. 9B
SPHERE
REGULAR CUBE
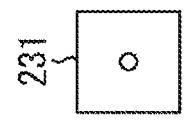
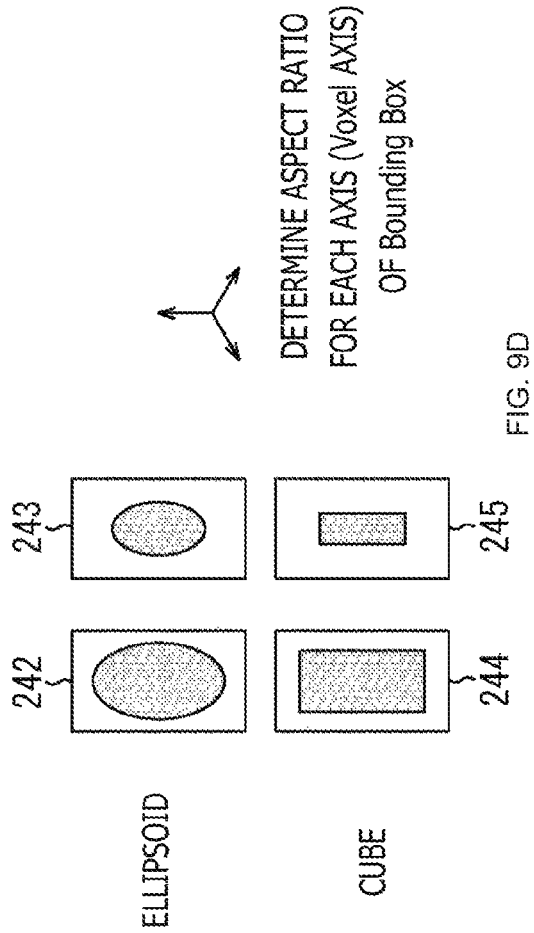
FIG. 9C
FIG. 9D
ELLIPSOID
CUBE
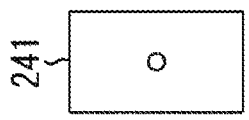

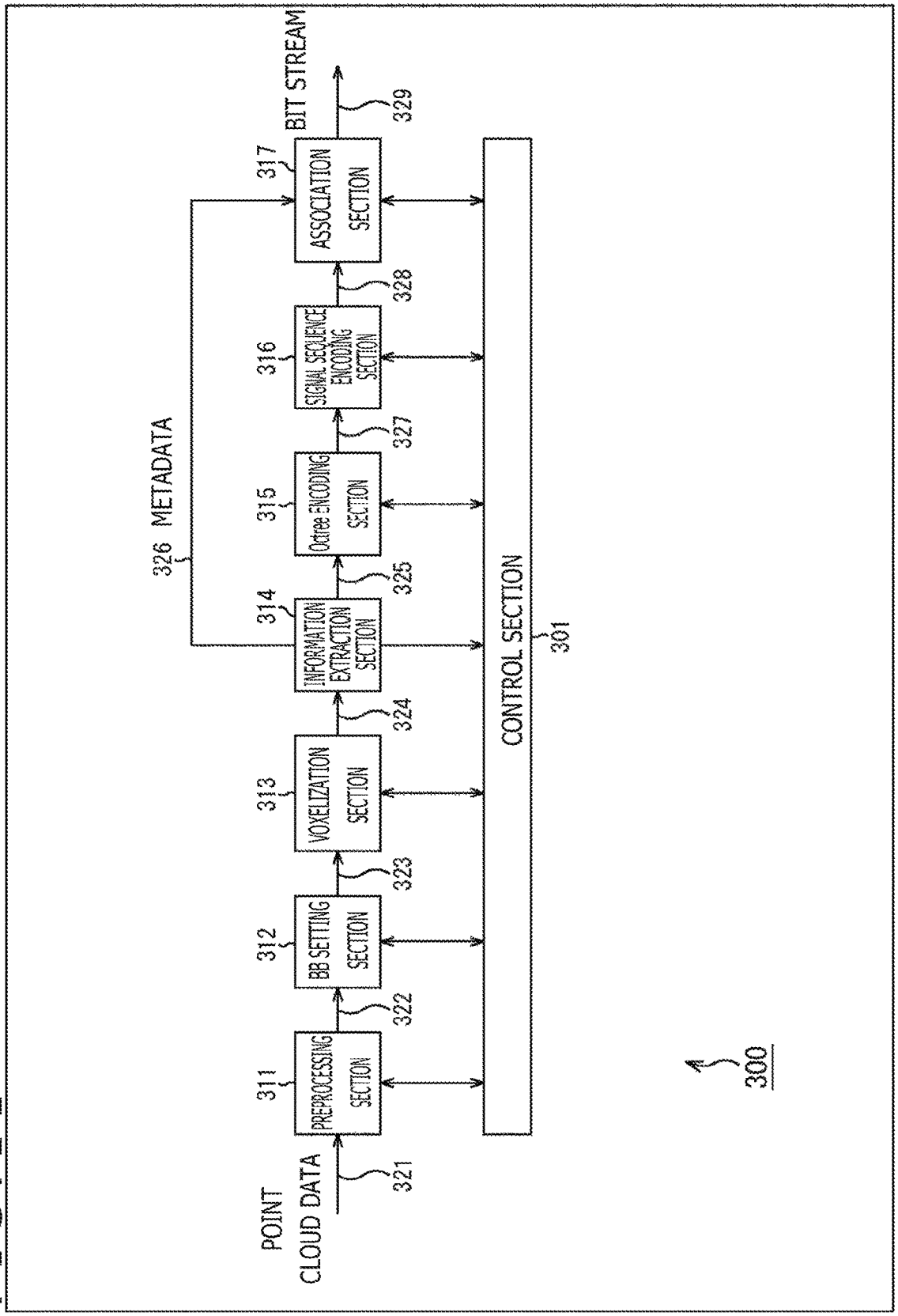

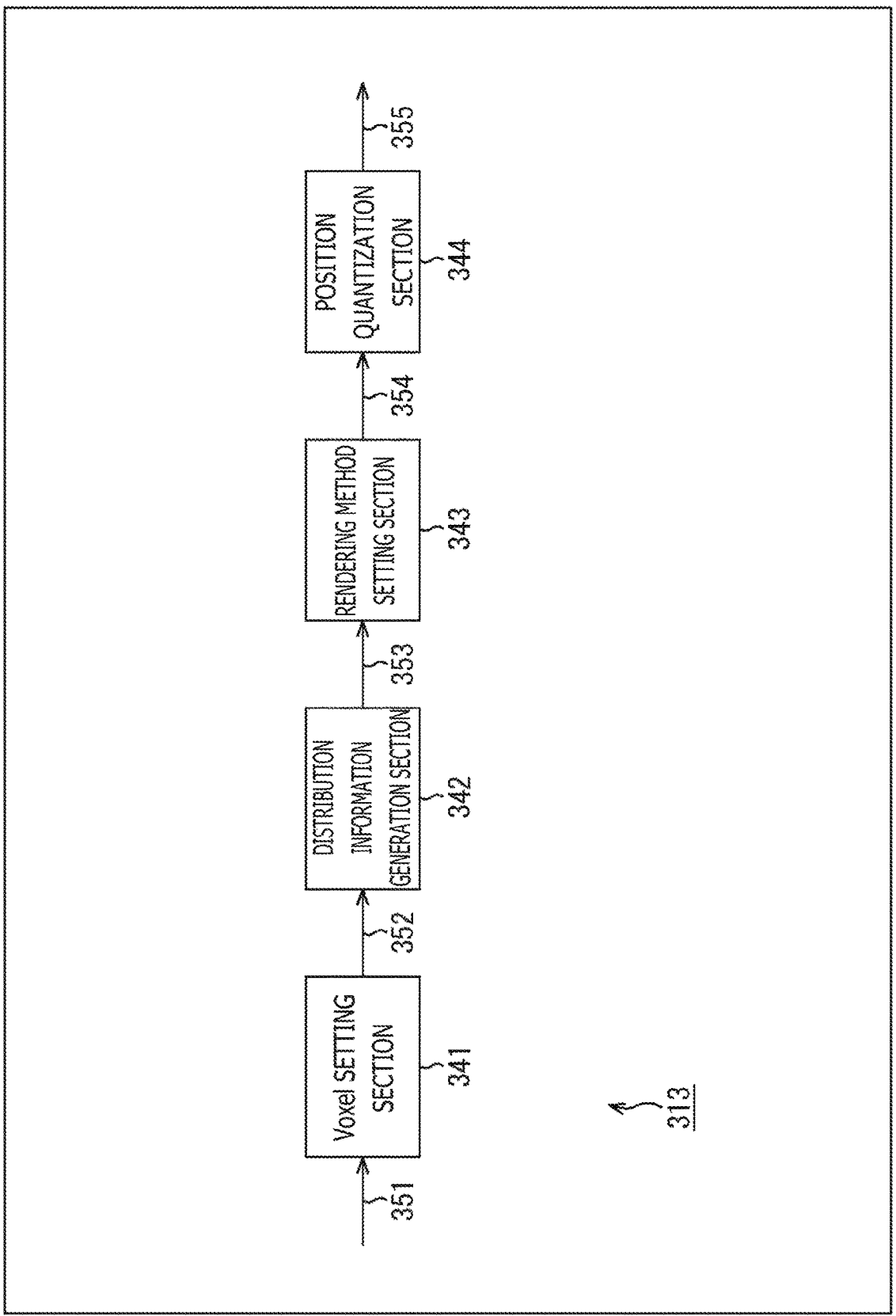

| Index | Voxel Aspect RATIO |
|---|---|
| 0 | (1, 1, 1) |
| 1 | (1, 0.5, 0.5) |
| 2 | . |
| 255 | USE Syntax VALUE |

FIG. 15A

| Index | Rendering Aspect RATIO |
|---|---|
| 0 | (1, 1, 1) |
| 1 | (1, 0.5, 0.5) |
| 2 | (0.5, 1.0, 0.5) |
| . | . |
| 255 | USE Syntax VALUE |

FIG. 15B

| Index | Rendering |
|---|---|
| 0 | INSCRIBED IN Voxel |
| 1 | RECTANGULAR SOLID |
| 2 | ELLIPSOID |
| 3 | POINT GROUP |

FIG. 15C

| Index | DENSITY NUMBER OF PIECES OF COLOR INFORMATION |
|---|---|
| 0 | |
| 1 | 3 |
| 2 | 7 |
| 255 | USE Syntax VALUE |

FIG. 15D

| Index | SIZE |
|---|---|
| 0 | 1.0 |
| 1 | 0.2 |
| . | . |
| 255 | USE Syntax VALUE |

FIG. 15E

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/000050 filed on Jan. 7, 2019, which claims priority benefit of Japanese Patent Application No. JP 2018-004667 filed in the Japan Patent Office on Jan. 16, 2018. Each of the above-referenced applications is hereby incorporated herein by reference in its entirety.

TECHNICAL FIELD

The present disclosure relates to an information processing apparatus and an information processing method, and particularly relates to an information processing apparatus and an information processing method capable of suppressing a reduction in quality of rendering results.

BACKGROUND ART

Conventionally, there has been known encoding such as Octree using voxels as a method of compressing a point cloud that represents a three-dimensional structure by position information, attribute information, and the like regarding a point group or compressing vertex data regarding a mesh configured with vertexes, edges, and surfaces and defining a three-dimensional shape using polygon representation (refer to, for example, NPL 1).

In such encoding, a bounding box is set to normalize position information regarding an object to be encoded. Currently, a principal voxelization approach for standardization to date is an approach for determining voxels on each of x, y, and z axes by the same number of splits. Owing to this, a shape of each voxel is always dependent on setting of a bounding box and is not necessarily constant.

CITATION LIST

Non Patent Literature

[NPL 1]
R. Mekuria, Student Member IEEE, K. Blom, P. Cesar., Member, IEEE, "Design, Implementation and Evaluation of a Point Cloud Codec for Tele-Immersive Video,"tcsvt_paper_submitted_february.pdf

SUMMARY

Technical Problem

However, a rendering method is constant regardless of the shape of a voxel. Owing to this, a shape of a rendering result does not coincide with the shape of the voxel, possibly resulting in a reduction in quality (quality in appearance) of the rendering result such as generation of gaps or overlaps among rendering results of respective voxels.

The present disclosure has been achieved in light of such circumstances, and an object of the present disclosure is to enable suppression of a reduction in quality of rendering results.

Solution to Problem

An information processing apparatus according to one aspect of the present technology is an information processing apparatus including a rendering section that performs rendering on voxel data that includes 3D data obtained by quantizing position information using voxels and representing a three-dimensional structure in response to a shape of each of the voxels.

An information processing method according to one aspect of the present technology is an information processing method including performing rendering on voxel data that includes 3D data obtained by quantizing position information using voxels and representing a three-dimensional structure in response to a shape of each of the voxels.

An information processing apparatus according to another aspect of the present technology is an information processing apparatus including a bit stream generation section that generates a bit stream containing encoded data regarding voxel data that includes 3D data obtained by quantizing position information using voxels and representing a three-dimensional structure and rendering information that includes information related to rendering of the voxel data.

An information processing method according to another aspect of the present technology is an information processing method including generating a bit stream containing encoded data regarding voxel data that includes 3D data obtained by quantizing position information using voxels and representing a three-dimensional structure and rendering information that includes information related to rendering of the voxel data.

An information processing apparatus according to yet another aspect of the present technology is an information processing apparatus including a rendering section that performs rendering on voxel data that includes 3D data obtained by quantizing position information using voxels and representing a three-dimensional structure on the basis of rendering information that includes information related to the rendering of the voxel data.

An information processing method according to yet another aspect of the present technology is an information processing method including performing rendering on voxel data that includes 3D data obtained by quantizing position information using voxels and representing a three-dimensional structure on the basis of rendering information that includes information related to the rendering of the voxel data.

In the information processing apparatus and the information processing method according to one aspect of the present technology, rendering is performed on voxel data that includes 3D data obtained by quantizing position information using voxels and representing a three-dimensional structure in response to a shape of each of the voxels.

In the information processing apparatus and the information processing method according to another aspect of the present technology, a bit stream containing encoded data regarding voxel data that includes 3D data obtained by quantizing position information using voxels and representing a three-dimensional structure and rendering information that includes information related to rendering of the voxel data is generated.

In the information processing apparatus and the information processing method according to yet another aspect of the present technology, rendering is performed on voxel data that includes 3D data obtained by quantizing position information using voxels and representing a three-dimensional structure on the basis of rendering information that includes information related to the rendering of the voxel data.

Advantageous Effect of Invention

According to the present disclosure, it is possible to process information. It is particularly possible to suppress a reduction in quality of rendering results.

BRIEF DESCRIPTION OF DRAWINGS

FIGS. 3A, 3B, 3C, and 3D depict explanatory diagrams of examples of a state of rendering results.

FIG. 4 is a block diagram depicting an example of principal configurations of an encoding apparatus.

FIGS. 5A, 5B, 5C, and 5D depict explanatory diagrams of an example of an outline of encoding.

FIGS. 9A, 9B, 9C, and 9D depict explanatory diagrams of examples of a state of rendering.

FIG. 11 is a block diagram depicting an example of principal configurations of an encoding apparatus.

FIG. 12 is a block diagram depicting an example of principal configurations of a voxelization section.

FIGS. 15A, 15B, 15C, 15D, and 15E depict explanatory diagrams of examples of signaled information.

DESCRIPTION OF EMBODIMENTS

Modes for carrying out the present disclosure (hereinafter, referred to as "embodiments") will be described hereinafter. It is noted that description will be given in the following order.

1. Encoding and decoding of 3D data
2. First embodiment (Rendering in response to shape of each voxel)
3. Second embodiment (Rendering in response to metadata)
4. Notes 1. Encoding and Decoding of 3D Data <Point Cloud>

Data such as a point cloud representing a three-dimensional structure by position information, attribute information, and the like regarding a point group and a mesh configured with vertexes, edges, and surfaces and defining a three-dimensional shape using polygon representation has been conventionally present.

Figure 1B:
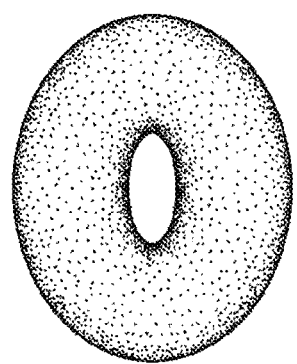
FIGS. 1A and 1B depict explanatory diagrams of an example of a point cloud.
Figure 1A:
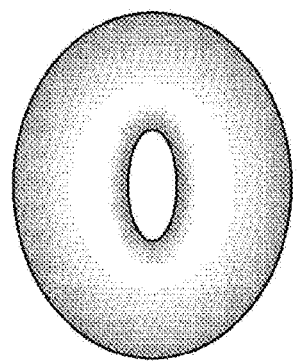

In a case of, for example, the point cloud, a stereoscopic structure depicted in FIG. 1A is represented as a set of many points (point group) depicted in FIG. 1B. In other words, point cloud data is configured with position information and attribute information (for example, a color) regarding each point in the point group. Therefore, a data structure is relatively simple and any stereoscopic structure can be represented with sufficiently high precision by using sufficiently many points.

<Quantization of Position Information and Rendering Using Voxels>

However, because of a relatively large data volume, such data as the point cloud and the mesh is required to compress the data volume by encoding or the like. Encoding methods, for example, Octree and KDtree, using voxels have been devised. A voxel is a data structure for quantizing position information regarding an object to be encoded.

Figures 2A, 2B:
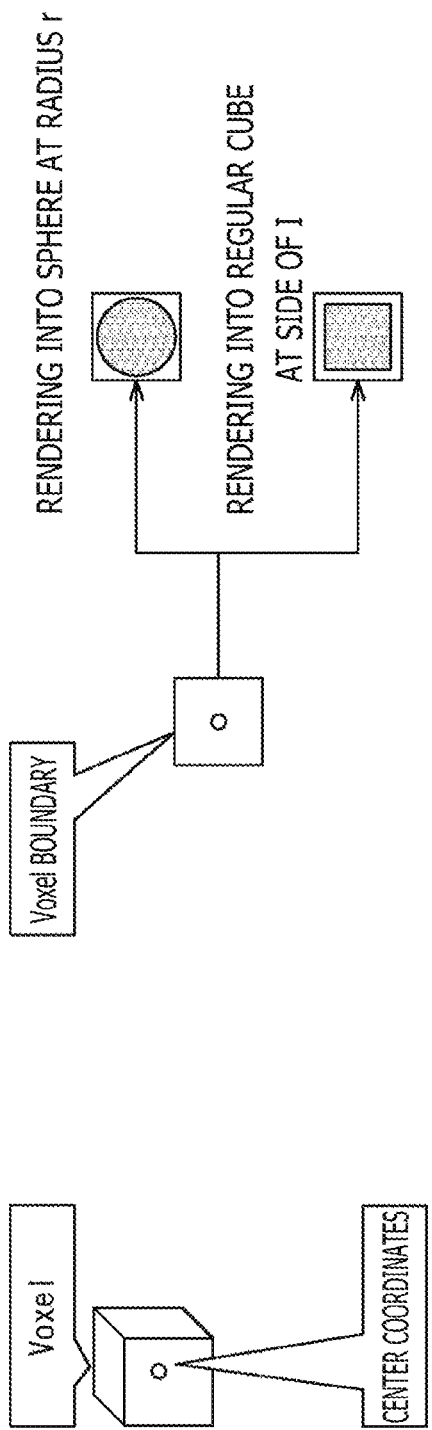
FIGS. 2A and 2B depict explanatory diagrams of an example of a state of rendering.

In a case of applying voxels, position information regarding a point is quantized to a center of a voxel as depicted in FIG. 2A. Therefore, at a time of rendering, the point is rendered as a graphic centering around a central position of the voxel.

If a rendering result (rendered graphic) of each voxel is smaller than the voxel, overall rendering results become a sparse point group, possibly reducing a quality (image quality) of the point group. Conversely, if the rendering result of each voxel is larger than the voxel (the rendering result extends off the voxel), overlaps among rendering results of respective voxels are generated, possibly reducing the quality (image quality) of the overall rendering results.

To address the problem, as depicted in, for example, FIG. 2B, each voxel is rendered in such a manner that a rendering result (rendered graphic) of the voxel is a maximum within the voxel. This can narrow gaps among the rendering results of the respective voxels and prevent generation of overlaps.

In a case of an example FIG. 2B, a voxel is rendered as a sphere at a radius of r or rendered as a regular cube at one side of I. Rendering each voxel in such a manner that any of such graphics (sphere or cube) is as large as possible within the voxel makes it possible to narrow the gaps and diminish the overlaps among the voxels. It is, therefore, possible to suppress a reduction in quality (image quality) of the overall rendering results.

However, encoding using such voxels is required to normalize the position information regarding the object to be encoded as a prerequisite, so that work for setting a solid referred to as a "bounding box" and containing the object to be encoded is carried out to meet the prerequisite. Currently, a principal voxelization approach for normalization to date is an approach for determining voxels on x, y, and z axes by the same number of splits. Owing to this, a shape of each voxel is always dependent on setting of the bounding box and is not necessarily constant.

As depicted in FIG. 3A, for example, an aspect ratio of a cube of each voxel depends on an aspect ratio of a bounding box, and the aspect ratio varies among the voxels. Therefore, if a constant rendering method is used regardless of the shape of each voxel, then a rendering result possibly extends off the voxel and a gap is possibly generated within the voxel as depicted in FIG. 3B. In other words, a quality (quality in appearance) of overall rendering results is possibly reduced.

Furthermore, a bounding box can be set into, for example, a columnar shape as depicted in FIG. 3C. In that case, a shape of each voxel is, for example, a shape depicted in FIG. 3D, which further differs from a rectangular voxel depicted in FIG. 3B and the like of FIGS. 3A, 3B, 3C, and 3D. Therefore, if rendering is performed on the voxel of such a shape by a method similar to a method used for rendering the rectangular voxel, it is possibly more difficult to suppress gaps and overlaps among rendering results. In other words, the quality of the overall rendering results is possibly more reduced.

2. First Embodiment

<Rendering in Response to Shape of Each Voxel>

To address the problem, rendering is performed on voxel data that is 3D data obtained by quantizing position information using voxels and representing a three-dimensional structure in response to a shape of each of the voxels. For example, an information processing apparatus is configured with a rendering section that performs rendering on voxel data that is 3D data obtained by quantizing position information using voxels and representing a three-dimensional structure in response to a shape of each of the voxels.

By doing so, it is possible to suppress gaps and overlaps among rendering results regardless of the shape of each voxel and, therefore, possible to suppress a reduction in quality of rendering results.

<Encoding Apparatus>

A more specific example will be described hereinafter. First, an encoding apparatus encoding a point cloud using voxels will be described. FIG. 4 is a block diagram depicting an example of principal configurations of such an encoding apparatus. In other words, an encoding apparatus 100 depicted in FIG. 4 encodes data regarding a point cloud input as an object to be encoded using voxels and outputs obtained encoded data and the like.

As depicted in FIG. 4, the encoding apparatus 100 has a control section 101, a preprocessing section 111, a BB setting section 112, a voxelization section 113, an Octree encoding section 114, and a signal sequence encoding section 115.

The control section 101 performs processing related to control over respective processing sections within the encoding apparatus 100. For example, the control section 101 exercises control over execution or skipping (omission) of processing performed by each processing section. For example, the control section 101 exercises such control on the basis of predetermined control information. By doing so, the control section 101 can suppress execution of unnecessary processing and suppress the increase of a load.

While the control section 101 may adopt any configuration, the control section 101 may have, for example, a CPU (Central Processing Unit), a ROM (Read Only Memory), a RAM (Random Access Memory), and the like, and the CPU may perform processing by loading a program and data stored in the ROM and the like to the RAM to execute the program.

The preprocessing section 111 carries out predetermined processing, as preprocessing, on point cloud data (object to be encoded) input to the encoding apparatus 100 and supplies processed data to the BB setting section 112 under control of the control section 101.

It is noted that the point cloud to serve as the object to be encoded may be either a moving image or a still image. Further, the preprocessing may have any content. For example, the preprocessing section 111 may perform, as the preprocessing, processing for reducing noise or processing for changing a resolution (the number of points). Further, for example, the preprocessing section 111 may update placement of each point in such a manner as to make uniform densities of a point group or to have a desired bias. Moreover, for example, data other than the point cloud, such as image information having depth information, may be input to the encoding apparatus 100, and the preprocessing section 111 may convert the input data into data regarding the point cloud as the preprocessing.

While the preprocessing section 111 may adopt any configuration, the preprocessing section 111 may have, for example, a CPU, a ROM, a RAM, and the like, and the CPU may perform preprocessing by loading a program and data stored in the ROM and the like to the RAM to execute the program.

The BB setting section 112 performs processing related to setting of a bounding box for normalizing position information regarding the object to be encoded under control of the control section 101. For example, the BB setting section 112 sets a bounding box with respect to each object as the object to be encoded. In a case in which objects 131 and 132 are represented by data regarding point cloud as depicted in, for example, FIG. 5A, the BB setting section 112 sets bounding boxes 141 and 142 to contain the objects 131 and 132, respectively as depicted in FIG. 5B. With reference back to FIG. 4, upon setting of the bounding box, the BB setting section 112 supplies information related to the bounding box to the voxelization section 113.

It is noted that while the BB setting section 112 may adopt any configuration, the BB setting section 112 may have, for example, a CPU, a ROM, a RAM, and the like, and the CPU may perform the processing related to the setting of the bounding box by loading a program and data stored in the ROM and the like to the RAM to execute the program.

The voxelization section 113 performs processing related to quantization of the position information regarding the object to be encoded under control of the control section 101.

For example, the voxelization section 113 sets voxels within the bounding box set by the BB setting section 112. As depicted in, for example, FIG. 5C, the voxelization section 113 splits the bounding box 141 and sets voxels 151. The voxelization section 113 then quantizes (that is, voxelizes) point cloud data within the bounding box by the voxels. By doing so, the point cloud data is converted into voxel data including position information and attribute information (color information and the like) regarding each voxel as depicted in FIG. 5D.

For example, the voxelization section 113 equally splits the bounding box by the number of splits common to directions of three axes (three axes perpendicular to one another) of x, y, and z axes in the directions of three axes of x, y, and z axes, and sets respective areas after splitting as voxels. The number of splits common to the three axes is contained in a bit stream, which will be described later, as metadata and transmitted to a decoding side.

Alternatively, for example, the voxelization section 113 equally splits the bounding box in the directions of three axes (three axes perpendicular to one another) of x, y, and z axes by the number of splits for each of the axes (the number of splits corresponding to each of the axes that are independent of one another), and sets respective areas after splitting as voxels. The number of splits corresponding to each of the axes is contained in the bit stream, which will be described later, as metadata and transmitted to the decoding side.

In another alternative, for example, the voxelization section 113 unequally splits the bounding box in the directions of three axes (three axes perpendicular to one another) of x, y, and z axes, and sets respective areas after splitting as voxels (also referred to as "nonlinear voxels").

Figure 6:
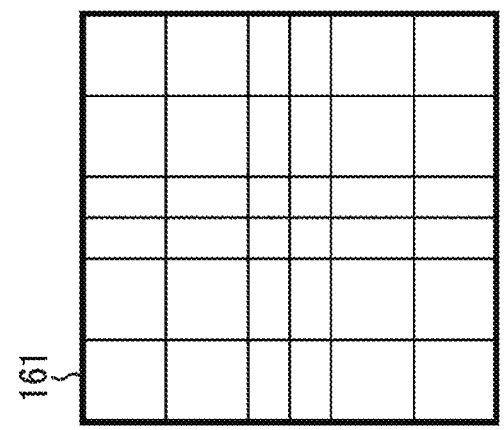
FIG. 6 is a diagram depicting an example of nonlinear area splitting.

For example, FIG. 6 is a schematic diagram representing voxels in two dimensions. In such a case, as depicted in FIG. 6, it is possible to set voxels different in magnitude and shape from each other in the same layer with respect to a bounding box 161. In other words, it is possible to increase small voxels by nonlinear voxels without increasing the number of layers, thereby making it possible to improve precision of quantization of more important areas.

In other words, in the case of nonlinear voxels, it is possible to improve precision of quantization without increasing the number of voxel layers. In other words, it is possible to improve precision of quantization while suppressing a reduction in encoding efficiency and an increase in processing time.

In such a case, the voxelization section 113 sets identification information indicating the nonlinear voxels and sets map information regarding the set voxels. The identification information and the map information are contained in the bit stream, which will be described later, as metadata and transmitted to the decoding side.

Needless to say, a voxel setting method may be any method and is not limited to the examples.

It is noted that in a case in which a plurality of bounding boxes is present, the voxelization section 113 voxelizes the point cloud data for each bounding box. In other words, in the case of an example of FIG. 5B, the voxelization section 113 performs similar processing on the bounding box 142. With reference back to FIG. 4, the voxelization section 113 supplies the voxelized point cloud data (also referred to as "voxel data") (information related to a data structure for quantization of the position information), the attribute information, and the like to the Octree encoding section 114.

It is noted that while the voxelization section 113 may adopt any configuration, the voxelization section 113 may have, for example, a CPU, a ROM, a RAM, and the like, and the CPU may perform processing related to setting of voxels by loading a program and data stored in the ROM and the like to the RAM to execute the program.

The Octree encoding section 114 performs processing related to Octree encoding under control of the control section 101. For example, the Octree encoding section 114 encodes (for example, performs Octree encoding on) the voxel data supplied from the voxelization section 113 on the basis of the data structure thereof, and generates a signal sequence. The Octree encoding section 114 supplies the generated signal sequence to the signal sequence encoding section 115.

It is noted that while the Octree encoding section 114 may adopt any configuration, the Octree encoding section 114 may have, for example, a CPU, a ROM, a RAM, and the like, and the CPU may perform processing related to generation of the signal sequence by loading a program and data stored in the ROM and the like to the RAM to execute the program.

The signal sequence encoding section 115 performs processing related to encoding of the supplied signal sequence under control of the control section 101. For example, the signal sequence encoding section 115 encodes the signal sequence supplied by the Octree encoding section 114 and generates encoded data (bit stream). A method of the encoding may be any method. The signal sequence encoding section 115 outputs the encoded data (bit stream) obtained in such a way to outside of the encoding apparatus 100. The data (encoded data and control information) output by the encoding apparatus 100 may be decoded by, for example, a subsequent processing section, which is not depicted, to reconstruct the data regarding the point cloud, may be transmitted by a communication section, which is not depicted, and transmitted to another apparatus such as a decoding apparatus (for example, a decoding apparatus 200 to be described later) via a predetermined transmission line, or may be recorded in a recording medium, which is not depicted.

It is noted that while the signal sequence encoding section 115 may adopt any configuration, the signal sequence encoding section 115 may have, for example, a CPU, a ROM, a RAM, and the like, and the CPU may perform processing related to encoding by loading a program and data stored in the ROM and the like to the RAM to execute the program.

<Flow of Encoding Processing>

Figure 7:
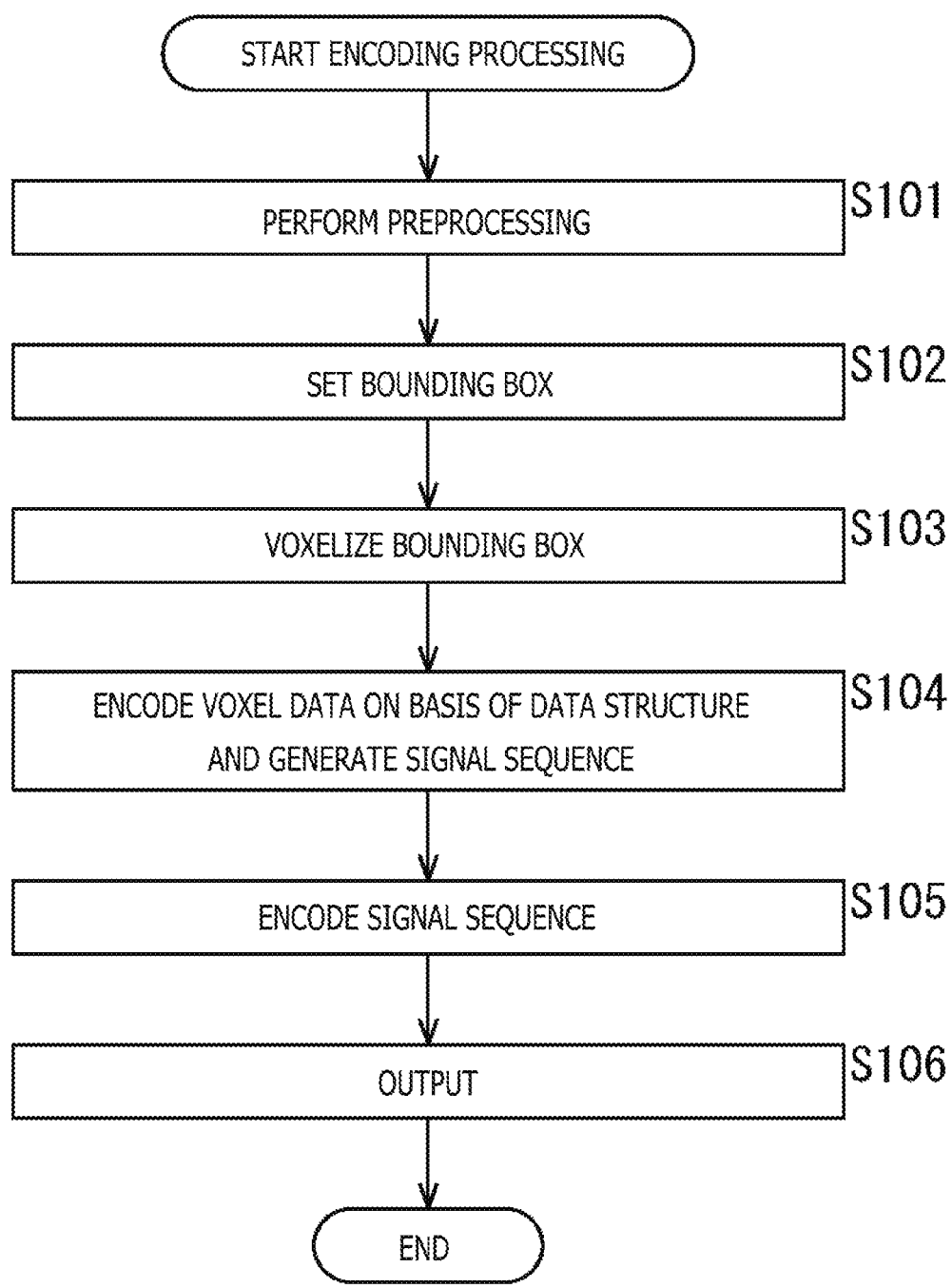
FIG. 7 is a flowchart illustrating an example of a flow of encoding processing.

An example of a flow of encoding processing executed by the encoding apparatus 100 configured as described above will be described with reference to a flowchart of FIG. 7.

When the encoding processing is started, the preprocessing section 111 performs preprocessing on input 3D data in Step S101.

In Step S102, the BB setting section 112 sets a bounding box with respect to the preprocessed 3D data.

In Step S103, the voxelization section 113 voxelizes the bounding box.

In Step S104, the Octree encoding section 114 encodes the voxel data on the basis of the data structure and generates a signal sequence.

In Step S105, the signal sequence encoding section 115 encodes the signal sequence.

In Step S106, the signal sequence encoding section 115 outputs a bit stream (bit stream containing the encoded data regarding the 3D data and the metadata such as the control information) obtained by the encoding to outside of the encoding apparatus 100.

When processing in Step S106 is ended, the encoding processing is ended. In a case in which the object to be encoded is, for example, a moving image, a series of processing is performed per frame.

<Decoding Apparatus>

Figure 8:
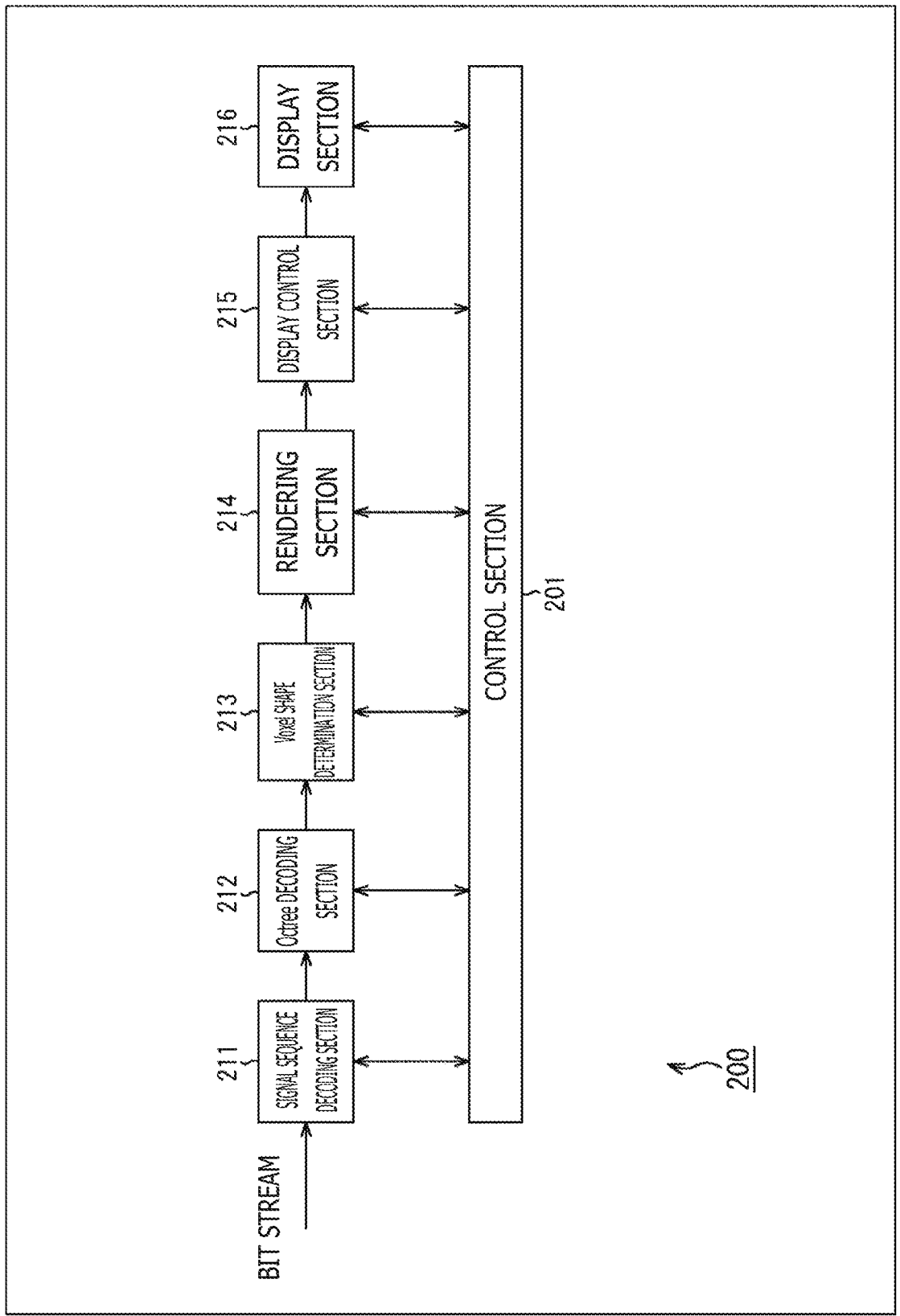
FIG. 8 is a block diagram depicting an example of principal configurations of a decoding apparatus.

FIG. 8 is a block diagram illustrating an example of principal configurations of a decoding apparatus that is one embodiment of the information processing apparatus to which the present technology is applied. The decoding apparatus 200 depicted in FIG. 8 is a decoding apparatus that corresponds to the encoding apparatus 100 of FIG. 4, decodes the bit stream (bit stream containing the encoded data regarding the 3D data and the like) output by, for example, the encoding apparatus 100, and reconstructs the 3D data. At that time, the decoding apparatus 200 performs the decoding (reconstruction) by a method to which the present technology is applied as described hereinafter.

As depicted in FIG. 8, the decoding apparatus 200 has a control section 201, a signal sequence decoding section 211, an Octree decoding section 212, a Voxel shape determination section 213, a rendering section 214, a display control section 215, and a display section 216.

The control section 201 performs processing related to control over respective processing sections within the decoding apparatus 200. For example, the control section 201 exercises control over execution or skipping (omission) of processing performed by each processing section. For example, the control section 201 exercises such control on the basis of predetermined control information. By doing so, the control section 201 can, for example, suppress execution of unnecessary processing and suppress the increase of a load.

While the control section 201 may adopt any configuration, the control section 201 may have, for example, a CPU, a ROM, a RAM, and the like, and the CPU may perform processing by loading a program and data stored in the ROM and the like to the RAM to execute the program.

The signal sequence decoding section 211 performs processing related to decoding of the bit stream containing the encoded data regarding the 3D data representing the three-dimensional structure (encoded data regarding the voxel data obtained by voxelizing the 3D data) and the like under control of the control section 201. The 3D data may be, for example, a point cloud.

For example, the signal sequence decoding section 211 acquires the bit stream supplied from the encoding apparatus 100. In addition, for example, the signal sequence decoding section 211 decodes the acquired bit stream that contains the encoded data by a decoding method corresponding to the encoding performed by the encoding apparatus 100 (signal sequence encoding section 115). The signal sequence decoding section 211 supplies a signal sequence obtained by decoding the encoded data together with the metadata such as the control information to the Octree decoding section 212.

It is noted that while the signal sequence decoding section 211 may adopt any configuration, the signal sequence decoding section 211 may have, for example, a CPU, a ROM, a RAM, and the like, and the CPU may perform processing related to decoding by loading a program and data stored in the ROM and the like to the RAM to execute the program.

The Octree decoding section 212 performs processing related to Octree decoding under control of the control section 201. For example, the Octree decoding section 212 decodes (for example, performs Octree decoding on) the signal sequence supplied from the signal sequence decoding section 211 on the basis of the data structure thereof. The Octree decoding section 212 supplies voxel data obtained by the decoding together with the metadata such as the control information to the Voxel shape determination section 213.

It is noted that while the Octree decoding section 212 may adopt any configuration, the Octree decoding section 212 may have, for example, a CPU, a ROM, a RAM, and the like, and the CPU may perform processing related to decoding by loading a program and data stored in the ROM and the like to the RAM to execute the program.

The Voxel shape determination section 213 performs processing related to determination of the shape of each voxel under control of the control section 201. For example, the Voxel shape determination section 213 determines the shape (form, magnitude, and the like) of each voxel on the basis of the voxel data, the metadata, and the like supplied from the Octree decoding section 212.

As described above, the voxel data is obtained by quantizing the position information regarding the 3D data, such as the point cloud, representing the three-dimensional structure using voxels. In addition, the voxels are obtained by splitting areas of the bounding box normalizing the 3D data. The metadata contains information such as a size of the bounding box and the number of splits at a time of setting voxels from the bounding box. The Voxel shape determination section 213 determines the shape (form, magnitude, and the like) of each voxel on the basis of such pieces of information.

In a case, for example, in which the metadata contains the information indicating the number of splits common to the three axes (three axes perpendicular to one another) of x, y, and z axes, the Voxel shape determination section 213 obtains (determines) the shape of each voxel by equally splitting the size of the bounding box by the common number of splits in each of the x, y, and z axis directions. In other words, the Voxel shape determination section 213 determines the shape of each voxel on the basis of the number of splits common to the three axes of the bounding box normalizing the 3D data.

Alternatively, in a case, for example, in which the metadata contains the information indicating the number of splits (the number of splits corresponding to each of the axes) for each of the three axes (three axes perpendicular to one another) of x, y, and z axes, the Voxel shape determination section 213 obtains (determines) the shape of each voxel by equally splitting the size of the bounding box by the corresponding number of splits in each of the x, y, and z axis directions. In other words, the Voxel shape determination section 213 determines the shape of each voxel on the basis of the number of splits corresponding to each of the axes of the bounding box normalizing the 3D data.

In another alternative, in a case, for example, in which the metadata contains the map information regarding voxels, the Voxel shape determination section 213 obtains (determines) the shape of each voxel from the map information. In other words, the Voxel shape determination section 213 determines the shape of each voxel on the basis of information indicating nonlinear splitting of the bounding box normalizing the 3D data. It is noted that the Voxel shape determination section 213 may use size information regarding the bounding box as needed.

The Voxel shape determination section 213 supplies a determination result of the shape of each voxel (information indicating the shape of each voxel) obtained as described above together with the voxel data and the metadata to the rendering section 214.

It is noted that while the Voxel shape determination section 213 may adopt any configuration, the Voxel shape determination section 213 may have, for example, a CPU, a ROM, a RAM, and the like, and the CPU may perform processing related to decoding by loading a program and data stored in the ROM and the like to the RAM to execute the program.

The rendering section 214 performs processing related to rendering under control of the control section 201. For example, the rendering section 214 performs rendering in response to the shape of each voxel on the basis of information and the like supplied from the Voxel shape determination section 213 and indicating the voxel data, the metadata, and the shape of each voxel. In other words, the rendering section 214 performs rendering in response to the shape of each voxel determined by the Voxel shape determination section 213. Specifically, the rendering section 214 renders the voxel data obtained by decoding the encoded data by the signal sequence decoding section 211 in response to the shape of each voxel.

In a case, for example, in which the shape of a voxel is a regular cube like a voxel 231 depicted in FIG. 9A, the rendering section 214 can render, for example, the voxel into a spherical shape like rendering results 232 and 233 depicted in FIG. 9B, or can render the voxel into a regular cubic shape like rendering results 234 and 235 depicted in FIG. 9B.

Furthermore, at that time, the rendering section 214 can perform rendering in response to the shape of the voxel 231 subjected to rendering since the rendering section 214 grasps the shape of the voxel 231 on the basis of the information indicating the shape of the voxel and the like.

For example, the rendering results 232 and 234 are results of rendering performed by the rendering section 214 in such a manner that the rendering results 232 and 234 are each inscribed in the voxel 231. By performing rendering in such a way, the rendering section 214 can enlarge the rendering result as much as possible in a range in which the rendering result does not extend off the voxel 231. In other words, by performing rendering in such a way, the rendering section 214 can diminish gaps as much as possible while suppressing generation of overlaps among the rendering results of respective voxels. It is, therefore, possible to suppress a reduction in quality of the rendering results.

It is noted that if there is an error in the rendering result or in a determination result of the voxel shape, the error possibly causes generation of overlaps among the rendering results when each rendering result is inscribed in the voxel. To address the problem, a margin (room) may be given between each rendering result and the voxel without inscribing the rendering result in the voxel to allow more suppression of the generation of overlaps among the rendering results. In a case of, for example, rendering results 233 and 235 depicted in FIG. 9B, the rendering is performed in such a manner that the rendering results 233 and 235 are smaller than the rendering results 232 and 234 depicted in FIG. 9B. Therefore, a gap becomes larger between each rendering result and the voxel, and the generation of overlaps among the rendering results is suppressed by as much as the larger gap.

Moreover, in a case, for example, in which the shape of the voxel is a cube (rectangular solid) like a voxel 241 depicted in FIG. 9C, the rendering section 214 can render, for example, the voxel into an ellipsoidal shape like rendering results 242 and 243 or can render the voxel into a cubic shape (rectangular solid-like shape) like rendering results 244 and 245 as depicted in FIG. 9D.

Furthermore, at that time, the rendering section 214 can perform rendering in response to the shape of the voxel 241 subjected to rendering since the rendering section 214 grasps the shape of the voxel 241 on the basis of the information indicating the shape of the voxel and the like. For example, the rendering results 242 and 244 depicted in FIG. 9D are results of rendering performed by the rendering section 214 in such a manner that the rendering results 242 and 244 are each inscribed in the voxel 241. By performing rendering in such a way, the rendering section 214 can enlarge the rendering result as much as possible in a range in which the rendering result does not extend off the voxel 241. In other words, by performing rendering in such a way, the rendering section 214 can diminish gaps as much as possible while suppressing generation of overlaps among the rendering results of respective voxels. It is, therefore, possible to suppress a reduction in quality of the rendering results.

It is noted that in such a case, similarly to the above case, a margin (room) may be given between each rendering result and the voxel without inscribing the rendering result in the voxel to allow more suppression of the generation of overlaps among the rendering results. In a case of, for example, rendering results 243 and 245 depicted in FIG. 9D, the rendering is performed in such a manner that the rendering results 243 and 245 are smaller than the rendering results 242 and 244 depicted in FIG. 9D. Therefore, a gap becomes larger between each rendering result and the voxel, and the generation of overlaps among the rendering results is suppressed by as much as the larger gap.

The rendering section 214 supplies the rendering results obtained as described above, that is, the 3D data to the display control section 215.

It is noted that while the rendering section 214 may adopt any configuration, the rendering section 214 may have, for example, a CPU, a ROM, a RAM, and the like, and the CPU may perform processing related to decoding by loading a program and data stored in the ROM and the like to the RAM to execute the program.

The display control section 215 performs processing related to display control under control of the control section 201. For example, the display control section 215 acquires the 3D data supplied from the rendering section 214 and indicating the rendering results. In addition, for example, the display control section 215 generates a 2D display image on the basis of the 3D data. The display control section 215 then supplies the display image to the display section 216.

It is noted that while the display control section 215 may adopt any configuration, the display control section 215 may have, for example, a CPU, a ROM, a RAM, and the like, and the CPU may perform processing related to decoding by loading a program and data stored in the ROM and the like to the RAM to execute the program.

The display section 216 performs processing related to display under control of the control section 201. For example, the display section 216 acquires the display image supplied from the display control section 215. In addition, the display section 216 displays the acquired display image on a display device owned by the display section 216. In other words, the display section 216 displays an image generated by performing rendering in response to the shape of each voxel by the rendering section 214.

By performing processing described above, it is possible to suppress gaps and overlaps among the rendering results regardless of the shape of each voxel, and, therefore, possible to suppress a reduction in quality of the rendering results.

<Flow of Decoding Processing>

Figure 10:
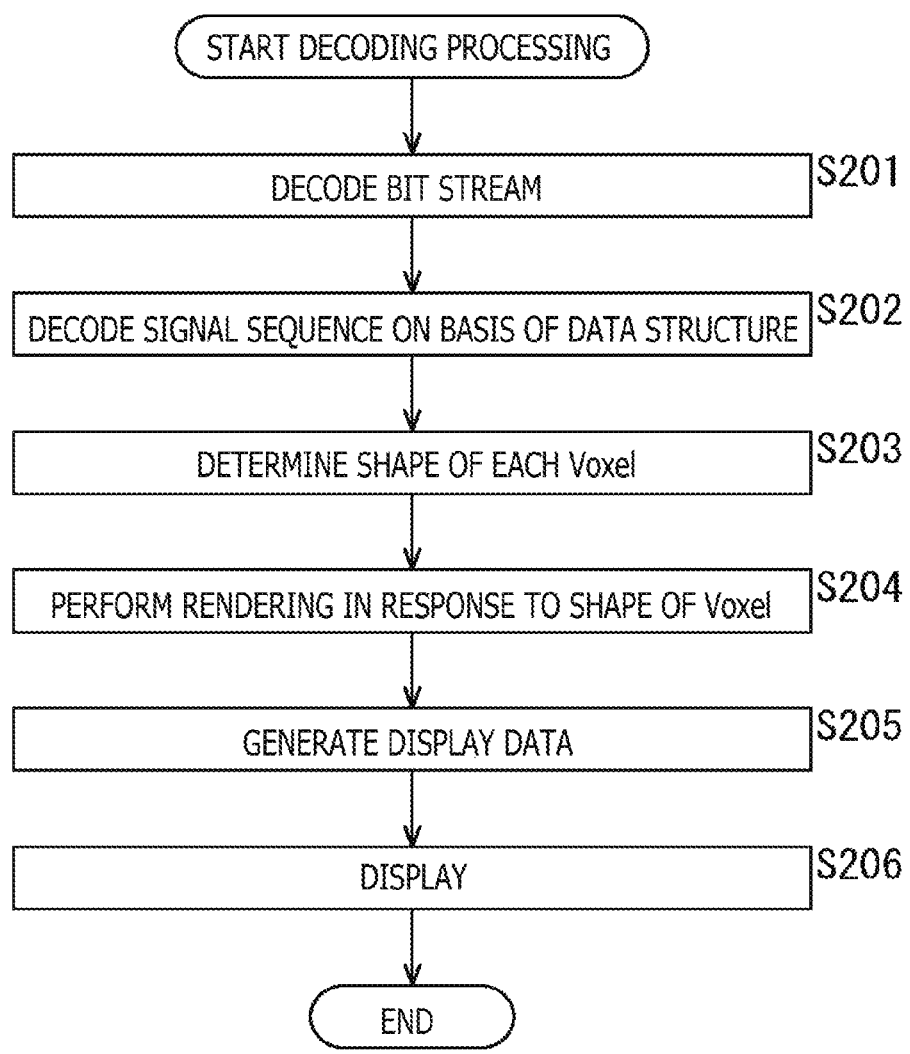
FIG. 10 is a flowchart illustrating an example of a flow of decoding processing.

An example of a flow of decoding processing executed by the decoding apparatus 200 configured as described above will be described with reference to a flowchart of FIG. 10.

When the decoding processing is started, the signal sequence decoding section 211 decodes an input bit stream and obtains a signal sequence in Step S201.

In Step S202, the Octree decoding section 212 decodes the signal sequence on the basis of the data structure thereof and obtains voxel data.

In Step S203, the Voxel shape determination section 213 determines the shape of each voxel with respect to the voxel data.

In Step S204, the rendering section 214 performs rendering on the voxel data on the basis of the shape of each voxel determined in Step S203.

In Step S205, the display control section 215 generates a 2D display image using rendering results (3D data).

In Step S206, the display section 216 displays the display image obtained in Step S205.

When processing in Step S206 is ended, the decoding processing is ended. In a case, for example, in which an object to be decoded is a moving image, a series of processing is performed per frame.

By performing the decoding processing described above, the decoding apparatus 200 can suppress gaps and overlaps among the rendering results regardless of the shape of each voxel, and can, therefore, suppress a reduction in quality of the rendering results.

3. Second Embodiment

<Signaling of Rendering Information>

It is noted that at the time of encoding 3D data as described above, an encoding side may set a rendering method of the decoding side and signal the method (provide the method as the metadata and the like) to the decoding side. The decoding side may then perform rendering on the basis of the information (that is, perform rendering by the method designated by the encoding side).

In other words, a bit stream containing encoded data regarding voxel data that is 3D data obtained by quantizing position information using voxels and representing a three-dimensional structure and rendering information that is information related to rendering of the voxel data is generated. For example, an information processing apparatus may be configured with a bit stream generation section that generates a bit stream containing encoded data regarding voxel data that is 3D data obtained by quantizing position information using voxels and representing a three-dimensional structure and rendering information that is information related to rendering of the voxel data.

By doing so, it is possible to suppress gaps and overlaps among rendering results regardless of the shape of each voxel and, therefore, possible to suppress a reduction in quality of the rendering results.

<Encoding Apparatus>

A more specific example will be described hereinafter. First, an encoding apparatus encoding a point cloud using voxels will be described. FIG. 11 is a block diagram depicting an example of principal configurations of such an encoding apparatus. An encoding apparatus 300 depicted in FIG. 11 encodes data regarding a point cloud input as an object to be encoded using voxels and outputs obtained encoded data and the like, similarly to the encoding apparatus 100.

As depicted in FIG. 11, the encoding apparatus 300 has a control section 301, a preprocessing section 311, a BB setting section 312, a voxelization section 313, an information extraction section 314, an Octree encoding section 315, a signal sequence encoding section 316, and an association section 317.

The control section 301 is a processing section similar to the control section 101, and performs processing related to control over respective processing sections within the encoding apparatus 300. For example, the control section 301 exercises control over execution or skipping (omission) of processing performed by each processing section. For example, the control section 301 exercises such control on the basis of predetermined control information. By doing so, the control section 301 can suppress execution of unnecessary processing and suppress the increase of a load.

While the control section 301 may adopt any configuration, the control section 301 may have, for example, a CPU, a ROM, a RAM, and the like, and the CPU may perform processing by loading a program and data stored in the ROM and the like to the RAM to execute the program.

The preprocessing section 311 performs processing related to preprocessing under control of the control section 301. For example, the preprocessing section 311 acquires 3D data (for example, point cloud data) input to the encoding apparatus 300 as an object to be encoded (arrow 321). In addition, the preprocessing section 311 carries out predetermined processing, as preprocessing, on the acquired 3D data. Furthermore, the preprocessing section 311 supplies the data processed as appropriate to the BB setting section 312 (arrow 322).

It is noted that the point cloud to serve as the object to be encoded may be either a moving image or a still image. Further, the preprocessing may have any content. For example, the preprocessing section 311 may perform, as the preprocessing, processing for reducing noise or processing for changing a resolution (the number of points). Further, for example, the preprocessing section 311 may update placement of each point in such a manner as to make uniform densities of a point group or to have a desired bias. Moreover, for example, data other than the point cloud, such as image information having depth information, may be input to the encoding apparatus 300, and the preprocessing section 311 may convert the input data into data regarding the point cloud as the preprocessing.

While the preprocessing section 311 may adopt any configuration, the preprocessing section 311 may have, for example, a CPU, a ROM, a RAM, and the like, and the CPU may perform preprocessing by loading a program and data stored in the ROM and the like to the RAM to execute the program.

The BB setting section 312 performs processing related to setting of a bounding box for normalizing position information regarding the object to be encoded under control of the control section 301, similarly to the BB setting section 112. For example, the BB setting section 312 acquires the 3D data supplied by the preprocessing section 311 and having been subjected to the preprocessing as appropriate (arrow 322). In addition, the BB setting section 312 sets a bounding box with respect to each object as the object to be encoded for the 3D data. The processing is similar in content to the processing performed by the BB setting section 112. Furthermore, the BB setting section 312 supplies information related to the set bounding box together with the 3D data to the voxelization section 313 (arrow 323).

It is noted that while the BB setting section 312 may adopt any configuration, the BB setting section 312 may have, for example, a CPU, a ROM, a RAM, and the like, and the CPU may perform the processing related to the setting of the bounding box by loading a program and data stored in the ROM and the like to the RAM to execute the program.

The voxelization section 313 performs processing related to quantization of the position information regarding the object to be encoded under control of the control section 301, similarly to the voxelization section 113. For example, the voxelization section 313 acquires the data supplied from the BB setting section 312 (arrow 323). In addition, the voxelization section 313 voxelizes the 3D data using the data and generates voxel data. Furthermore, the voxelization section 313 supplies the generated voxel data together with the other data to the information extraction section 314 (arrow 324).

Processing for the voxelization may have any content. For example, the voxelization section 313 may set voxels within the bounding box set by the BB setting section 312. Furthermore, the voxelization section 313 may generate distribution information indicating a state of distribution of the 3D data. Moreover, the voxelization section 313 may quantize the position information regarding the 3D data. Further, the voxelization section 313 may set a method of rendering the voxel data obtained by quantizing the position information regarding the 3D data.

It is noted that while the voxelization section 313 may adopt any configuration, the voxelization section 313 may have, for example, a CPU, a ROM, a RAM, and the like, and the CPU may perform processing related to setting of voxels by loading a program and data stored in the ROM and the like to the RAM to execute the program.

The information extraction section 314 performs processing related to extraction of information under control of the control section 301. For example, the information extraction section 314 acquires the data supplied from the voxelization section 313 (arrow 324). In addition, the information extraction section 314 extracts desired information from the acquired data and generates information related to rendering (rendering information). Furthermore, the information extraction section 314 supplies the rendering information to the association section 317 as metadata (arrow 326). Moreover, the information extraction section 314 supplies the voxel data to the Octree encoding section 315 (arrow 325).

The information (that is, rendering information) extracted by the information extraction section 314 may have any content. For example, the information may contain information related to the bounding box set by the BB setting section 312. In addition, the information may contain information related to the voxels set by the voxelization section 313. Furthermore, the information may contain the distribution information generated by the voxelization section 313. Further, the information may contain information related to the rendering method set by the voxelization section 313. Details of the rendering information will be described later.

It is noted that while the information extraction section 314 may adopt any configuration, the information extraction section 314 may have, for example, a CPU, a ROM, a RAM, and the like, and the CPU may perform processing related to setting of voxels by loading a program and data stored in the ROM and the like to the RAM to execute the program.

The Octree encoding section 315 performs processing related to Octree encoding under control of the control section 301, similarly to the Octree encoding section 114. For example, the Octree encoding section 315 acquires the voxel data supplied from the information extraction section 314 (arrow 325). In addition, the Octree encoding section 315 encodes (for example, performs Octree encoding on) the acquired voxel data on the basis of the data structure thereof, and generates a signal sequence. Furthermore, the Octree encoding section 315 supplies the generated signal sequence to the signal sequence encoding section 316 (arrow 327).

It is noted that while the Octree encoding section 315 may adopt any configuration, the Octree encoding section 315 may have, for example, a CPU, a ROM, a RAM, and the like, and the CPU may perform processing related to generation of the signal sequence by loading a program and data stored in the ROM and the like to the RAM to execute the program.

The signal sequence encoding section 316 performs processing related to encoding of the supplied signal sequence under control of the control section 301, similarly to the signal sequence encoding section 115. For example, the signal sequence encoding section 316 acquires the signal sequence supplied by the Octree encoding section 315 (arrow 327). In addition, the signal sequence encoding section 316 encodes the acquired signal sequence and generates encoded data (bit stream). A method of the encoding may be any method. The signal sequence encoding section 316 supplies the encoded data obtained in such a way to the association section 317.

It is noted that while the signal sequence encoding section 316 may adopt any configuration, the signal sequence encoding section 316 may have, for example, a CPU, a ROM, a RAM, and the like, and the CPU may perform processing related to encoding by loading a program and data stored in the ROM and the like to the RAM to execute the program.

The association section 317 performs processing related to association of data under control of the control section 301. For example, the association section 317 acquires the metadata (rendering information) supplied from the information extraction section 314 (arrow 326). In addition, the association section 317 acquires the encoded data supplied from the signal sequence encoding section 316 (arrow 327). Furthermore, the association section 317 associates the acquired metadata with the acquired encoded data. For example, the association section 317 adds the metadata to a bit stream containing the encoded data.

As described above, the encoded data supplied from the signal sequence encoding section 316 is obtained by encoding the voxel data. In addition, the voxel data is obtained by quantizing the position information regarding the 3D data, such as the point cloud, representing the three-dimensional structure using voxels. Furthermore, the voxels are obtained by splitting areas of the bounding box normalizing the 3D data.

Furthermore, the metadata contains not only information such as a size of the bounding box and the number of splits at a time of setting voxels from the bounding box but also the rendering information and the like.

In other words, the association section 317 generates a bit stream containing the encoded data regarding the voxel data that is the 3D data obtained by quantizing the position information using voxels and representing the three-dimensional structure, and the rendering information that is information related to rendering of the voxel data.

Furthermore, the association section 317 outputs the bit stream to outside of the encoding apparatus 300 (arrow 329). The data (encoded data and control information) output by the encoding apparatus 300 may be decoded by, for example, a subsequent processing section, which is not depicted, to reconstruct the data regarding the point cloud, may be transmitted by a communication section, which is not depicted, and transmitted to another apparatus such as a decoding apparatus (for example, a decoding apparatus 400 to be described later) via a predetermined transmission line, or may be recorded in a recording medium, which is not depicted.

While the association section 317 may adopt any configuration, the association section 317 may have, for example, a CPU, a ROM, a RAM, and the like, and the CPU may perform processing related to encoding by loading a program and data stored in the ROM and the like to the RAM to execute the program.

<Configuration of Voxelization Section>

FIG. 12 is a block diagram depicting an example of principal configurations of the voxelization section 313. The voxelization section 313 in the example depicted in FIG. 12 has a Voxel setting section 341, a distribution information generation section 342, a rendering method setting section 343, and a position quantization section 344.

The Voxel setting section 341 performs processing related to setting of voxels for quantizing the position information. For example, the Voxel setting section 341 acquires the data supplied from the BB setting section 312 (FIG. 11) (arrow 351). In addition, the Voxel setting section 341 sets voxels with reference to each bounding box set by the BB setting section 312. Furthermore, the Voxel setting section 341 supplies information related to the set voxels together with the other data to the distribution information generation section 342 (arrow 352).

The voxel setting method is similar to a case of the voxelization section 113, and may be, for example, a method using the number of splits common to three axes, a method using the number of splits corresponding to each of the axes, a method using information indicating nonlinear splitting (nonlinear voxel map information and the like), or the other method.

While the Voxel setting section 341 may adopt any configuration, the Voxel setting section 341 may have, for example, a CPU, a ROM, a RAM, and the like, and the CPU may perform processing related to encoding by loading a program and data stored in the ROM and the like to the RAM to execute the program.

The distribution information generation section 342 performs processing related to generation of distribution information. For example, the distribution information generation section 342 acquires the data supplied from the Voxel setting section 341 (arrow 352). In addition, the distribution information generation section 342 generates distribution information indicating a state of distribution of points in the 3D data before quantization using the acquired data. The distribution information generation section 342 supplies the generated distribution information together with the other data to the rendering method setting section 343 (arrow 353).

The distribution information is information indicating how points before quantization are distributed within voxels. The distribution information is signaled (provided to the decoding side as metadata) and used for rendering performed by the decoding side.

Figure 13A:
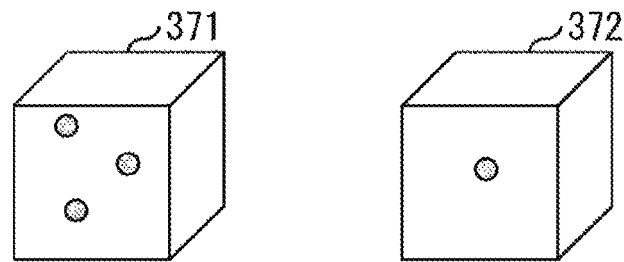
FIGS. 13A, 13B, 13C, and 13D depict explanatory diagrams of examples of a state of rendering.

As depicted in, for example, FIG. 13A, when a voxel 371 containing information regarding a plurality of points is quantized, position information regarding those points is quantized to a central position of the voxel like a voxel 372. Therefore, it is difficult to perform rendering in such a manner as to reproduce (to be more approximate to) a point group in the voxel 371 before quantization only from information regarding the voxel 372 after quantization.

To address the problem, the distribution information generation section 342 generates distribution information representing a state of distribution of points before quantization (state of distribution of points in the voxel 371 in the case of an example of FIG. 13A), and signals the distribution information to the bit stream.

By doing so, the decoding side can perform rendering in such a manner as to reproduce (to be more approximate to) the distribution of points before quantization while referring to the distribution information. In other words, the decoding side can obtain rendering results more approximate to the 3D data before quantization. It is, therefore, possible to suppress a reduction in quality of the rendering results.

The distribution information may be configured with any information. In other words, a representation method of the state of distribution of points before quantization may be any method. For example, the state of distribution of points may be represented by a shape, a size, an aspect ratio, and the like.

Figure 13B:

For example, an outline of the state of distribution of points in a voxel 373 depicted in FIG. 13B can be represented as a rectangular solid as depicted in a voxel 374. In other words, in such a case, the state of distribution of points can be represented by a rectangular solid indicating a shape (general shape) of the distribution, a size of the rectangular solid, and an aspect ratio of the rectangular solid.

Figure 13C:

Furthermore, an outline of a state of distribution of points in a voxel 375 depicted in FIG. 13C, for example, can be represented as a small ellipsoid as depicted in a voxel 376. In other words, in such a case, the state of distribution of points can be represented by an ellipsoid indicating a shape of the distribution and a size of the ellipsoid. It is noted that an aspect ratio can be omitted in a case in which the size of the ellipsoid is sufficiently small in such a way.

Figure 13D:

Moreover, an outline of a state of distribution of points in a voxel 377 depicted in FIG. 13D, for example, can be represented as a large ellipsoid as depicted in a voxel 378. In other words, in such a case, the state of distribution of points can be represented by an ellipsoid indicating a shape of the distribution, a size of the ellipsoid, and an aspect ratio of the ellipsoid.

In such a way, the state of distribution of points before quantization can be simply represented by such information as the shape, the size, and the aspect ratio.

It is noted that while the distribution information generation section 342 may adopt any configuration, the distribution information generation section 342 may have, for example, a CPU, a ROM, a RAM, and the like, and the CPU may perform processing related to encoding by loading a program and data stored in the ROM and the like to the RAM to execute the program.

The rendering method setting section 343 performs processing related to setting of a rendering method. For example, the rendering method setting section 343 acquires the data supplied from the distribution information generation section 342 (arrow 353). In addition, the rendering method setting section 343 sets a rendering method using the acquired data. Furthermore, the rendering method setting section 343 supplies information related to the set rendering method together with the other data to the position quantization section 344 (arrow 354).

Figure 14:
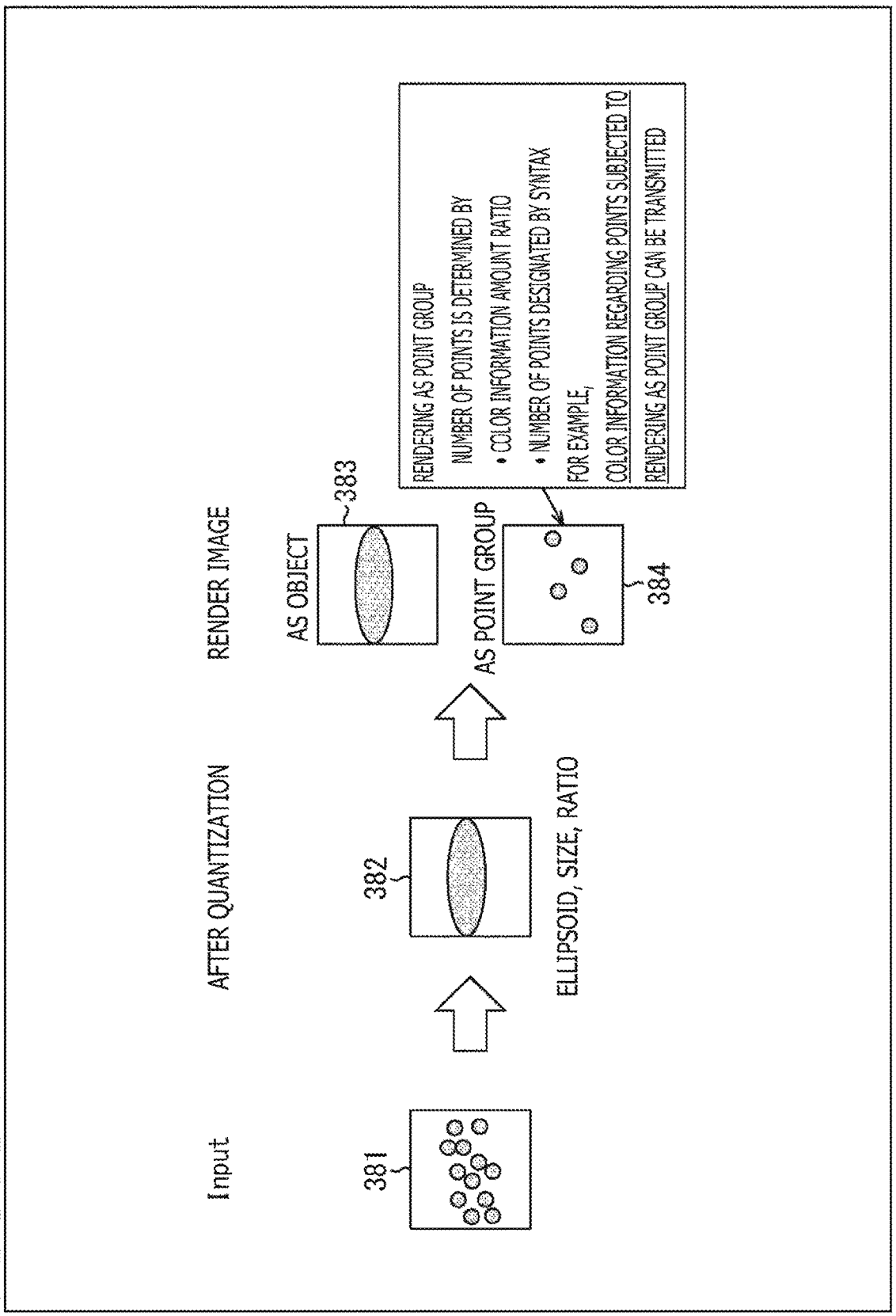
FIG. 14 is an explanatory diagram of an example of a state of rendering.

The rendering method is how to render quantized voxels. For example, a voxel 382 obtained by quantizing a voxel 381 of FIG. 14 is rendered on the basis of the distribution information (for example, shape, size, and aspect ratio) regarding the voxel 382 and the like. At that time, the voxel 382 can be rendered in such a manner as to represent the distribution information (state of the distribution indicated by the distribution information) as an object like a voxel 383, or can be rendered in such a manner as to represent a distribution method as a point group like a voxel 384.

The rendering method setting section 343 performs setting of such a rendering method. A setting method may be any method. For example, the rendering method setting section 343 may perform setting on the basis of a user's instruction, preset setting, and the like. Furthermore, the rendering method setting section 343 may adaptively set a rendering method in response to a situation.

It is noted that in a case of rendering the voxel as the point group like the voxel 384 of FIG. 14, the number of points may be set in response to a color information amount ratio (the number of pieces of color information) of each voxel contained in the voxel data, or set to the number of points designated in a syntax. For example, color information regarding points to be rendered may be transmitted as the number of points.

While the rendering method setting section 343 may adopt any configuration, the rendering method setting section 343 may have, for example, a CPU, a ROM, a RAM, and the like, and the CPU may perform processing related to encoding by loading a program and data stored in the ROM and the like to the RAM to execute the program.

The position quantization section 344 performs processing related to quantization of the position information. For example, the position quantization section 344 acquires the data supplied from the rendering method setting section 343 (arrow 354). In addition, the position quantization section 344 quantizes the position information regarding the 3D data using the acquired data and generates voxel data. In other words, the position quantization section 344 quantizes the position information regarding the 3D data using the voxels set by the Voxel setting section 341. Furthermore, the position quantization section 344 supplies the generated voxel data together with the other data to the information extraction section 314 (FIG. 11) (arrow 355).

It is noted that while the position quantization section 344 may adopt any configuration, the position quantization section 344 may have, for example, a CPU, a ROM, a RAM, and the like, and the CPU may perform processing related to encoding by loading a program and data stored in the ROM and the like to the RAM to execute the program.

<Rendering Information>

The rendering information signaled to the bit stream will next be described. As described above, the information extraction section 314 extracts the rendering information, and the association section 317 contains the rendering information in the bit stream as the metadata.

The rendering information may be any information as long as the information can be used at a time of rendering performed by the decoding side. For example, the rendering information may contain the information related to the shape of each voxel (voxel shape information) set by the Voxel setting section 341.

The voxel shape information may have any content as long as the content is related to the shape of each voxel set by the Voxel setting section 341. For example, the voxel shape information may contain information indicating an aspect ratio of the voxel (Voxel Aspect ratio). As depicted in, for example, FIG. 15A, the voxel shape information (that is, rendering information) may contain an index (Index) indicating the aspect ratio of each voxel.

Furthermore, the voxel shape information may contain, for example, information indicating a size of each voxel. The size may be a size common to the three-axis directions, a size corresponding to each of the three-axis directions, or map information regarding nonlinear voxels.

Moreover, the rendering information may contain, for example, information indicating an aspect ratio of rendering (Rendering Aspect ratio), that is, an aspect ratio of a rendering range at a time of rendering.

The aspect ratio of rendering is information set on the basis of an aspect ratio of the distribution of points before quantization contained in the distribution information when, for example, the information extraction section 314 extracts information. For example, the information extraction section 314 sets the aspect ratio of the distribution of points before quantization contained in the distribution information as the aspect ratio of rendering as it is. Alternatively, the information extraction section 314 may correct the aspect ratio of the distribution of points before quantization contained in the distribution information on the basis of, for example, the other information such as the rendering method set by the rendering method setting section 343, and may set the corrected aspect ratio as the aspect ratio of rendering.

As depicted in, for example, FIG. 15B, the rendering information may contain an index (Index) indicating the aspect ratio of rendering.

Moreover, the rendering information may contain, for example, information indicating a shape of rendering, that is, a shape of the rendering range (Rendering) at the time of rendering. The rendering information may contain, for example, information indicating whether the shape of the rendering range is inscribed in a voxel, or whether the shape of the rendering range is a rectangular solid, an ellipsoid, a point group, or the like.

The shape of rendering is information set on the basis of the shape of the distribution of points before quantization contained in the distribution information when, for example, the information extraction section 314 extracts information. For example, the information extraction section 314 sets the shape of the distribution of points before quantization contained in the distribution information as the shape of rendering as it is. Alternatively, the information extraction section 314 may change the shape of the distribution of points before quantization contained in the distribution information on the basis of, for example, the other information such as the rendering method set by the rendering method setting section 343, and set the changed shape as the shape of rendering.

As depicted in, for example, FIG. 15C, the rendering information may contain an index (Index) indicating the shape of rendering.

Moreover, the rendering information may contain, for example, information indicating a density of rendering, that is, the number of points to be rendered at the time of rendering. The rendering information may contain, for example, information indicating whether to render the same number of points as the number of pieces of color information corresponding to a voxel contained in the voxel data, whether to render a predetermined number of points, whether to render the number of points indicated by a syntax, or the like.

The density (the number of points) of rendering is information set on the basis of the rendering method set by the rendering method setting section 343 or the like when, for example, the information extraction section 314 extracts information.

As depicted in FIG. 15D, for example, the rendering information may contain an index (Index) indicating the density (the number of points) of rendering.

Moreover, the rendering information may contain, for example, information indicating a size of rendering, that is, a size of the rendering range at the time of rendering.

The size of rendering is information set on the basis of the size of the distribution of points before quantization contained in the distribution information when, for example, the information extraction section 314 extracts information. For example, the information extraction section 314 sets the size of the distribution of points before quantization contained in the distribution information as the size of rendering as it is. Alternatively, the information extraction section 314 may change the size of the distribution of points before quantization contained in the distribution information on the basis of, for example, the other information such as the rendering method set by the rendering method setting section 343, and set the changed size as the size of rendering. The size may be a size common to the three-axis directions or a size corresponding to each of the three-axis directions.

As depicted in FIG. 15E, for example, the rendering information may contain an index (Index) indicating the size of rendering.

Signaling such rendering information (providing such rendering information to the decoding side) makes it possible for the decoding side to perform rendering in such a manner as to reproduce the distribution before quantization more correctly. It is, therefore, possible to suppress a reduction in quality of the rendering results.

<Flow of Encoding Processing>

An example of a flow of encoding processing in such a case will be described with reference to a flowchart of FIG. 16.

When encoding processing is started, the preprocessing section 311 performs preprocessing on input 3D data in Step S301.

In Step S302, the BB setting section 312 sets a bounding box with respect to the preprocessed 3D data.

In Step S303, the voxelization section 313 voxelizes the bounding box.

In Step S304, the information extraction section 314 extracts information related to rendering (rendering information) from data acquired in processing up to Step S303.

In Step S305, the Octree encoding section 315 encodes voxel data obtained in Step S303 on the basis of the data structure and generates a signal sequence.

In Step S306, the signal sequence encoding section 316 encodes the signal sequence.

In Step S307, the association section 317 associates the rendering information extracted in Step S304, as metadata, with encoded data obtained in Step S306, and generates a bit stream.

In Step S308, the association section 317 outputs the obtained bit stream (bit stream containing the encoded data regarding the 3D data and the metadata such as the control information) to outside of the encoding apparatus 300.

When processing in Step S308 is ended, the encoding processing is ended. In a case in which the object to be encoded is, for example, a moving image, a series of processing is performed per frame.

<Flow of Voxelization Processing>

Next, an example of a flow of voxelization processing executed in Step S303 of FIG. 16 will be described with reference to a flowchart of FIG. 17.

When the voxelization processing is started, the Voxel setting section 341 sets voxels to the 3D data with the bounding box set as a reference in Step S321.

In Step S322, the distribution information generation section 342 generates distribution information.

In Step S323, the rendering method setting section 343 sets a rendering method.

In Step S324, the position quantization section 344 quantizes the position information regarding the 3D data and generates voxel data.

Figure 16:
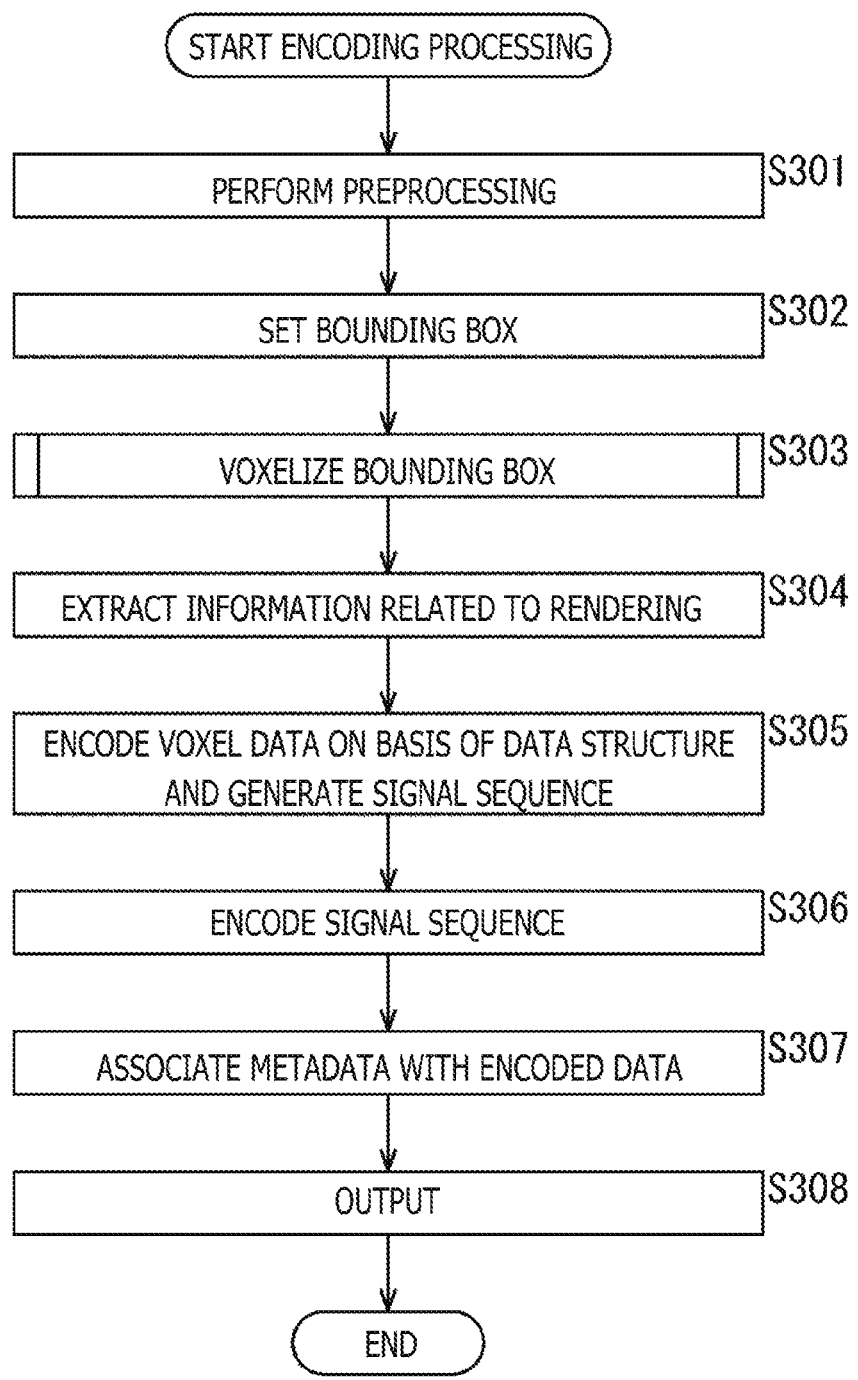
FIG. 16 is a flowchart illustrating an example of a flow of encoding processing.
Figure 17:
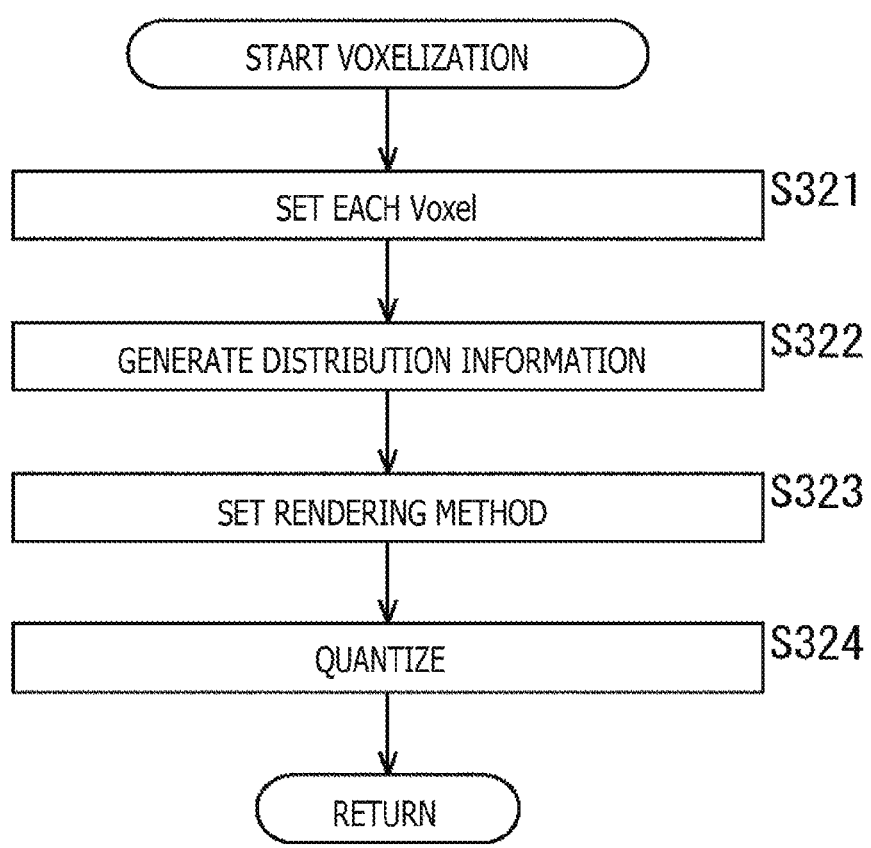
FIG. 17 is a flowchart illustrating an example of a flow of voxelization processing.

When processing in Step S324 is ended, then the voxelization processing is ended and the processing returns to FIG. 16.

By executing a series of processing described above, the encoding apparatus 300 can signal the rendering information. Therefore, the decoding side can perform rendering in such a manner as to reproduce the distribution before quantization more correctly. It is, therefore, possible to suppress a reduction in quality of the rendering results.

<Utilization of Signaled Rendering Information>

The decoding side may perform rendering on the basis of the rendering information signaled by the encoding side as described above.

In other words, the decoding side may render voxel data that is 3D data obtained by quantizing position information using voxels and representing a three-dimensional structure on the basis of rendering information that is information related to rendering of the voxel data. For example, an information processing apparatus may be configured with a rendering section that performs rendering on voxel data that is 3D data obtained by quantizing position information using voxels and representing a three-dimensional structure on the basis of rendering information that is information related to the rendering of the voxel data.

By doing so, it is possible to perform rendering in such a manner as to reproduce the state of distribution of the point group before quantization more correctly, and, therefore, suppress a reduction in quality of rendering results.

<Decoding Apparatus>

Figure 18:
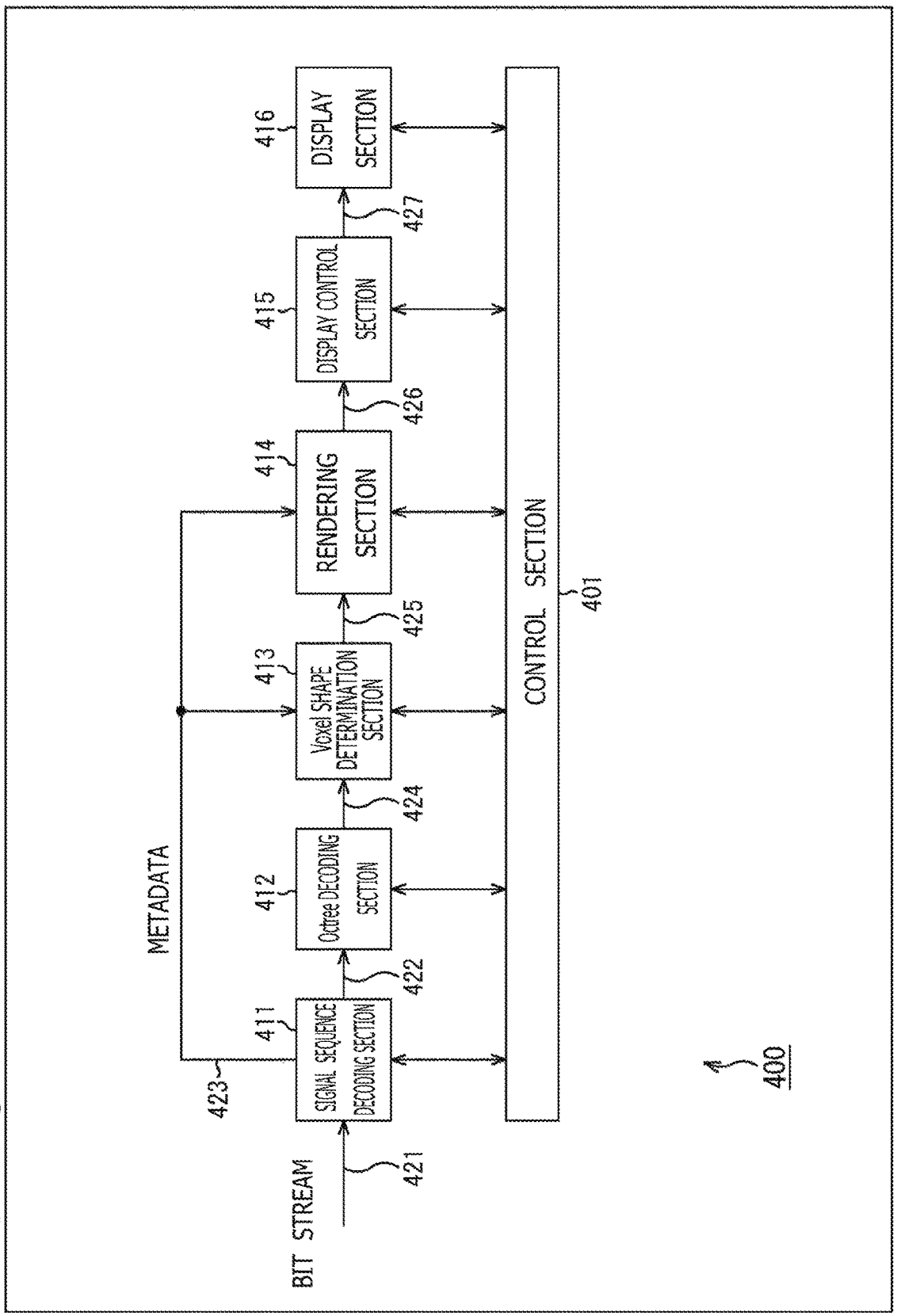
FIG. 18 is a block diagram depicting an example of principal configurations of a decoding apparatus.

FIG. 18 is a block diagram illustrating an example of principal configurations of a decoding apparatus that is one embodiment of the information processing apparatus to which the present technology is applied in such a case. The decoding apparatus 400 depicted in FIG. 18, which is an apparatus basically performing similar processing to that performed by the decoding apparatus 200 of FIG. 8, is a decoding apparatus that corresponds to the encoding apparatus 300 of FIG. 11. The decoding apparatus 400 decodes the bit stream (bit stream containing the encoded data regarding the 3D data and the like) output by, for example, the encoding apparatus 300, and reconstructs the 3D data. At that time, the decoding apparatus 400 performs such decoding (reconstruction) by a method to which the present technology is applied as described hereinafter.

As depicted in FIG. 18, the decoding apparatus 400 has a control section 401, a signal sequence decoding section 411, an Octree decoding section 412, a Voxel shape determination section 413, a rendering section 414, a display control section 415, and a display section 416.

The control section 401 performs processing related to control over respective processing sections within the decoding apparatus 400, similarly to the control section 201. For example, the control section 401 exercises control over execution or skipping (omission) of processing performed by each processing section. For example, the control section 401 exercises such control on the basis of predetermined control information. By doing so, the control section 201 can, for example, suppress execution of unnecessary processing and suppress the increase of a load.

While the control section 401 may adopt any configuration, the control section 401 may have, for example, a CPU, a ROM, a RAM, and the like, and the CPU may perform processing by loading a program and data stored in the ROM and the like to the RAM to execute the program.

The signal sequence decoding section 411 performs processing related to decoding of the bit stream containing the encoded data regarding the 3D data representing the three-dimensional structure (encoded data regarding the voxel data obtained by voxelizing the 3D data) and the like under control of the control section 401, similarly to the signal sequence decoding section 411. The 3D data may be, for example, a point cloud.

For example, the signal sequence decoding section 411 acquires the bit stream supplied from the encoding apparatus 300 (arrow 421). In addition, for example, the signal sequence decoding section 411 decodes the encoded data contained in the acquired bit stream by a decoding method corresponding to the encoding performed by the encoding apparatus 300 (signal sequence encoding section 316). The signal sequence decoding section 411 supplies a signal sequence obtained by decoding the encoded data to the Octree decoding section 412 (arrow 422).

In addition, the signal sequence decoding section 411 extracts the metadata such as the control information from the bit stream. The metadata contains information related to the bounding box, information related to the number of splits, the rendering information described above, and the like. The signal sequence decoding section 411 supplies the metadata (rendering information and the like) to the Voxel shape determination section 413 and the rendering section 414 (arrow 423).

It is noted that while the signal sequence decoding section 411 may adopt any configuration, the signal sequence decoding section 411 may have, for example, a CPU, a ROM, a RAM, and the like, and the CPU may perform processing related to decoding by loading a program and data stored in the ROM and the like to the RAM to execute the program.

The Octree decoding section 412 performs processing related to Octree decoding under control of the control section 401, similarly to the Octree decoding section 212. For example, the Octree decoding section 412 acquires the signal sequence supplied from the signal sequence decoding section 411 (arrow 422). In addition, the Octree decoding section 412 decodes (for example, performs Octree decoding on) the acquired signal sequence on the basis of the data structure thereof. The Octree decoding section 412 supplies voxel data obtained by the decoding to the Voxel shape determination section 413 (arrow 424).

It is noted that while the Octree decoding section 412 may adopt any configuration, the Octree decoding section 412 may have, for example, a CPU, a ROM, a RAM, and the like, and the CPU may perform processing related to decoding by loading a program and data stored in the ROM and the like to the RAM to execute the program.

The Voxel shape determination section 413 performs processing related to determination of the shape of each voxel under control of the control section 401, similarly to the Voxel shape determination section 213. For example, the Voxel shape determination section 413 acquires the voxel data supplied from the Octree decoding section 412. In addition, the Voxel shape determination section 413 acquires the metadata supplied from the signal sequence decoding section 411.

The Voxel shape determination section 413 determines the shape (form, magnitude, and the like) of each voxel on the basis of the metadata and the like.

In a case, for example, in which the metadata contains information related to the size of the bounding box and information indicating the number of splits common to the three axes (three axes perpendicular to one another) of x, y, and z axes, the Voxel shape determination section 413 obtains (determines) the shape of each voxel by equally splitting the size of the bounding box by the common number of splits in each of the directions of the x, y, and z axes. In other words, the Voxel shape determination section 213 determines the shape of each voxel on the basis of the number of splits common to the three axes of the bounding box normalizing the 3D data.

Alternatively, in a case, for example, in which the metadata contains the information related to the size of the bounding box and the information indicating the number of splits (the number of splits corresponding to each of the axes) for each of the three axes (three axes perpendicular to one another) of x, y, and z axes, the Voxel shape determination section 413 obtains (determines) the shape of each voxel by equally splitting the size of the bounding box by the corresponding number of splits in each of the x, y, and z axis directions. In other words, the Voxel shape determination section 413 determines the shape of each voxel on the basis of the number of splits corresponding to each of the axes of the bounding box normalizing the 3D data.

In another alternative, in a case, for example, in which the metadata contains the information related to the size of the bounding box and map information regarding voxels, the Voxel shape determination section 413 obtains (determines) the shape of each voxel from the map information. In other words, the Voxel shape determination section 413 determines the shape of each voxel on the basis of information indicating nonlinear splitting of the bounding box normalizing the 3D data. It is noted that the Voxel shape determination section 413 may use size information regarding the bounding box as needed.

The Voxel shape determination section 413 supplies a determination result of the shape of each voxel (information indicating the shape of each voxel) obtained as described above together with the other data to the rendering section 414 (arrow 425).

It is noted that while the Voxel shape determination section 413 may adopt any configuration, the Voxel shape determination section 413 may have, for example, a CPU, a ROM, a RAM, and the like, and the CPU may perform processing related to decoding by loading a program and data stored in the ROM and the like to the RAM to execute the program.

The rendering section 414 performs processing related to rendering under control of the control section 401, similarly to the rendering section 214. For example, the rendering section 414 acquires the voxel data and the information indicating the shape of each voxel supplied from the Voxel shape determination section 413 (arrow 425). In addition, the rendering section 414 acquires the metadata supplied from the signal sequence decoding section 411 (arrow 423).

The rendering section 414 performs rendering in response to the rendering information and the shape of each voxel on the basis of such pieces of information. In other words, the rendering section 414 renders the voxel data supplied from the Voxel shape determination section 413 in response to the shape of each voxel determined by the Voxel shape determination section 413 and the rendering information contained in the metadata supplied from the signal sequence decoding section 411.

The rendering information contains the information described with reference to FIGS. 15A, 15B, 15C, 15D, and 15E. The rendering section 414 sets how to render data regarding each voxel by directly using such pieces of information or by obtaining a new parameter by combination of the information as appropriate, and performs rendering in accordance with the setting.

In a case, for example, in which an aspect ratio of each voxel (Vx, Vy, Vz) is signaled as in the example of FIG. 15A, it is possible to obtain the shape of each voxel (size in the three-axis directions (Vx×Size, Vy×Size, Vz×Size)) by multiplying the voxel aspect ratio (Vx, Vy, Vz) by the size common to the three axes (Size).

Likewise, it is also possible to obtain a shape of each voxel (Vx×Sx, Vy×Sy, Vz×Sz) by multiplying the voxel aspect ratio (Vx, Vy, Vz) by a size corresponding to each of the axes (Sx, Sy, Sz).

Furthermore, in a case, for example, in which the aspect ratio of rendering (Rx, Ry, Rz) is signaled as in the example of FIG. 15B, it is possible to obtain the shape of rendering (rendering range) (size in the three-axis directions (Rx×Size, Ry×Size, Rz×Size)) by multiplying the rendering aspect ratio (Rx, Ry, Rz) by the size common to the three axes (Size).

Moreover, multiplication of the voxel aspect ratio (Vx, Vy, Vz), the rendering aspect ratio (Rx, Ry, Rz), and the size common to the three axes (Size) (Vx×Rx×Size, Vy×Ry×Size, Vz×Rz×Size) may be used.

As described above, the rendering section 414 performs rendering on the basis of the shape of each voxel and the rendering information and can, therefore, perform rendering by the rendering method designated by the encoding side. Therefore, as depicted in, for example, FIGS. 13A, 13B, 13C, and 13D, the rendering section 414 can perform rendering in such a manner as to reproduce the state of the distribution of the point group before quantization more correctly (that is, to coincide with or to be more approximate to the state of the distribution of the point group before quantization). It is, therefore, possible to suppress a reduction in quality of the rendering results.

It is noted that the rendering section 414 can perform rendering in such a manner that each rendering result is inscribed in the voxel at the time of such rendering, similarly to the case of the first embodiment.

The rendering section 414 supplies the rendering results obtained as described above, that is, the 3D data to the display control section 215 (arrow 426).

It is noted that while the rendering section 414 may adopt any configuration, the rendering section 414 may have, for example, a CPU, a ROM, a RAM, and the like, and the CPU may perform processing related to decoding by loading a program and data stored in the ROM and the like to the RAM to execute the program.

The display control section 415 performs processing related to display control under control of the control section 401, similarly to the display control section 215. For example, the display control section 415 acquires the 3D data supplied from the rendering section 414 and indicating the rendering results (arrow 426). In addition, for example, the display control section 415 generates a 2D display image on the basis of the 3D data. The display control section 415 then supplies the display image to the display section 416 (arrow 427).

It is noted that while the display control section 415 may adopt any configuration, the display control section 415 may have, for example, a CPU, a ROM, a RAM, and the like, and the CPU may perform processing related to decoding by loading a program and data stored in the ROM and the like to the RAM to execute the program.

The display section 416 performs processing related to display under control of the control section 401, similarly to the display section 216. For example, the display section 416 acquires the display image supplied from the display control section 415 (arrow 427). In addition, the display section 416 displays the acquired display image on a display device owned by the display section 416. In other words, the display section 416 displays an image generated by performing rendering in response to the shape of each voxel and the rendering information by the rendering section 414.

By performing processing described above, it is possible to perform rendering in such a manner as to more correctly reproduce the state of the distribution of the point group before quantization and, therefore, suppress a reduction in quality of the rendering results.

<Flow of Decoding Processing>

Figure 19:
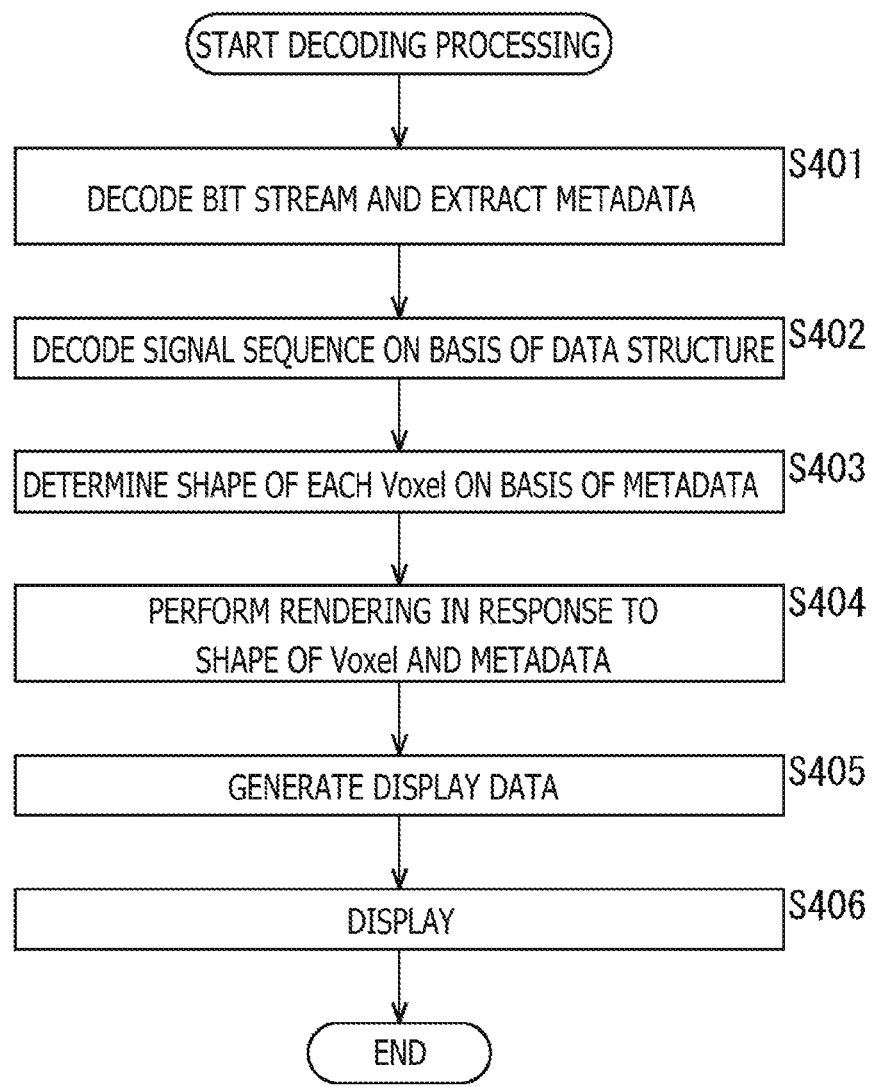
FIG. 19 is a flowchart illustrating an example of a flow of decoding processing.

An example of a flow of decoding processing executed by the decoding apparatus 400 configured as described above will be described with reference to a flowchart of FIG. 19.

When the decoding processing is started, the signal sequence decoding section 411 decodes an input bit stream and obtains a signal sequence in Step S401.

In Step S402, the Octree decoding section 412 decodes the signal sequence on the basis of the data structure thereof and obtains voxel data.

In Step S403, the Voxel shape determination section 413 determines the shape of each voxel on the basis of the metadata.

In Step S404, the rendering section 414 performs rendering on the basis of the shape of each voxel determined in Step S403 and the rendering information contained in the metadata.

In Step S405, the display control section 415 generates a 2D display image using the rendering results (3D data).

In Step S406, the display section 416 displays the display image obtained in Step S405.

When processing in Step S406 is ended, the decoding processing is ended. In a case, for example, in which an object to be decoded is a moving image, a series of processing is performed per frame.

By performing the decoding processing described above, the decoding apparatus 400 can perform rendering in such a manner as to more correctly reproduce the state of the distribution of the point group before quantization, and, therefore, suppress a reduction in quality of the rendering results.

4. Notes

<Control Information>

Control information related to the present technology described in the embodiments so far may be transmitted from an encoding side to a decoding side. For example, control information (for example, enabled_flag) for controlling whether or not to permit (or prohibit) application of the present technology described above may be transmitted. Alternatively, for example, control information for designating a range (for example, one of or both of an upper limit and a lower limit of a block size, a slice, a picture, a sequence, a component, a view, and a layer) of permitting (or prohibiting) application of the present technology described above may be transmitted.

<Computer>

A series of processing described above can be either executed by hardware or executed by software. In a case of executing a series of processing by the software, a program configuring the software is installed into a computer. Types of the computer include herein a computer incorporated into dedicated hardware, and a computer, for example, a general-purpose personal computer, capable of executing various functions by installing various programs into the computer.

Figure 20:
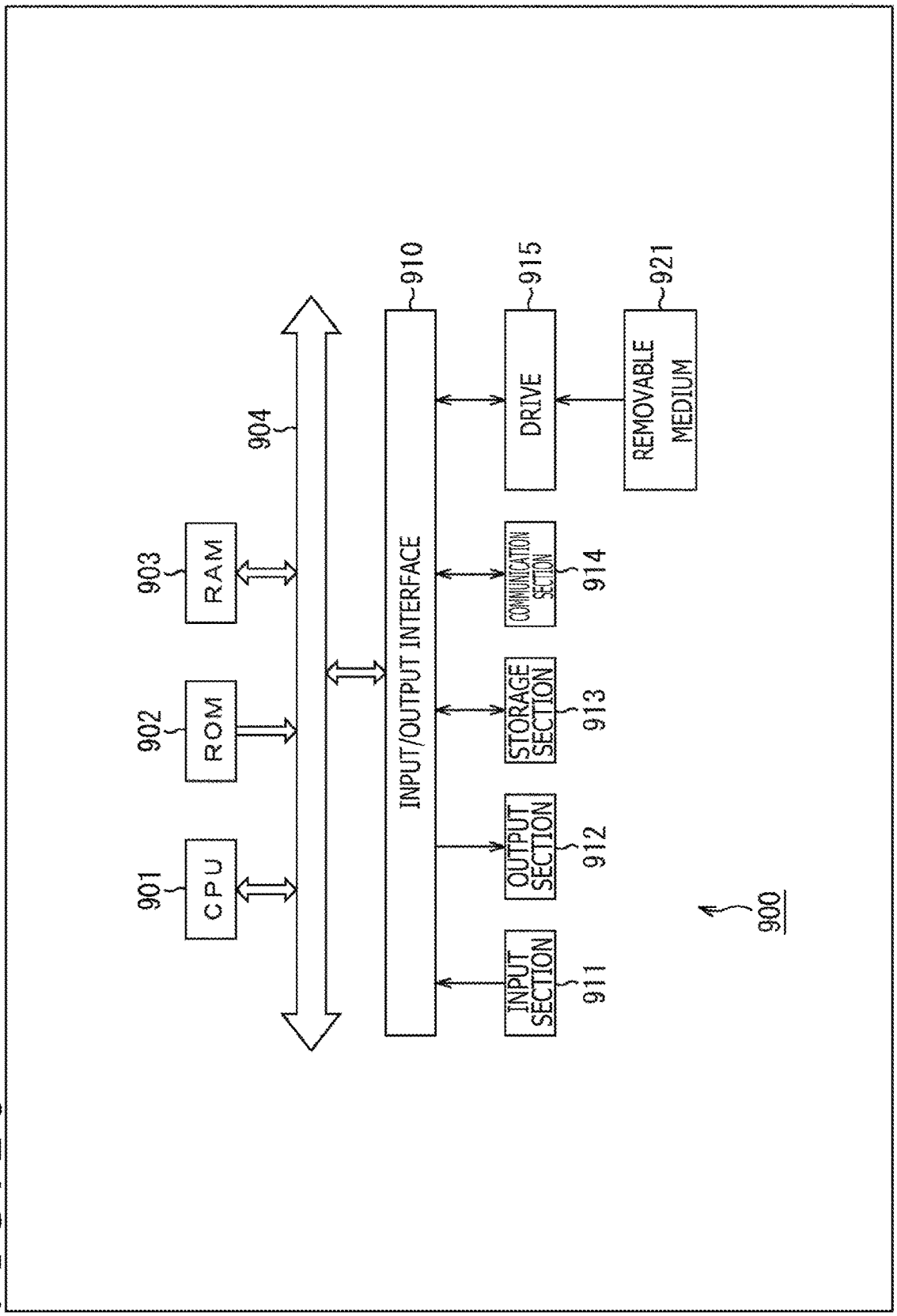
FIG. 20 is a block diagram depicting an example of principal configurations of a computer.

FIG. 20 is a block diagram depicting an example of a configuration of the hardware of the computer executing a series of processes described above by a program.

In the computer 900 depicted in FIG. 20, a CPU (Central Processing Unit) 901, a ROM (Read Only Memory) 902, and a RAM (Random Access Memory) 903 are mutually connected by a bus 904.

An input/output interface 910 is also connected to the bus 904. An input section 911, an output section 912, a storage section 913, a communication section 914, and a drive 915 are connected to the input/output interface 910.

The input section 911 is configured from, for example, a keyboard, a mouse, a microphone, a touch panel, and an input terminal. The output section 912 is configured from, for example, a display, a speaker, and an output terminal. The storage section 913 is configured from, for example, a hard disk, a RAM disk, and a nonvolatile memory. The communication section 914 is configured from, for example, a network interface. The drive 915 drives a removable medium 921 such as a magnetic disk, an optical disk, a magneto-optical disk, or a semiconductor memory.

In the computer configured as described above, the CPU 901 loads a program stored in, for example, the storage section 913 to the RAM 903 via the input/output interface 910 and the bus 904 and executes the program, whereby a series of processing described above is performed. Data and the like necessary for the CPU 901 to execute various processing are also stored in the RAM 903 as appropriate.

The program executed by the computer (CPU 901) can be applied by, for example, recording the program in the removable medium 921 serving as a package medium or the like. In that case, the program can be installed into the storage section 913 via the input/output interface 910 by attaching the removable medium 921 to the drive 915.

Furthermore, the program can be provided via a wired or wireless transmission medium such as a local area network, the Internet, or a digital satellite service. In that case, the program can be received by the communication section 914 and installed into the storage section 913.

In another alternative, the program can be installed into the ROM 902 or the storage section 913 in advance.

<Objects to Which Present Technology is Applied>

While a case of applying the present technology to voxelization of the point cloud data has been described above, the application of the present technology is not limited to such a case and the present technology is applicable to voxelization of 3D data under any standard. In other words, without contradiction with the present technology described above, various types of processing in an encoding scheme, a decoding scheme, and the like and various types of data such as 3D and metadata may have any specification. In addition, without contradiction with the present technology, part of processing and specifications described above may be omitted.

Furthermore, the present technology is applicable to any configuration while the encoding apparatus 100, the decoding apparatus 200, the encoding apparatus 300, and the decoding apparatus 400 have been described above as examples to which the present technology is applied.

For example, the present technology is applicable to various electronic apparatuses such as a transmitter and a receiver (for example, a television receiver and a cellular telephone) in distribution on satellite broadcasting, wired broadcasting for a cable TV and the like, and the Internet and in distribution to a terminal by cellular communication, and apparatuses (for example, a hard disk recorder and a camera) for recording images in a medium such as an optical disk, a magnetic disk, and a flash memory and reproducing images from such storage mediums.

Furthermore, the present technology is carried out as part of configurations of an apparatus such as a processor (for example, a video processor) serving as a system LSI (Large Scale Integration) or the like, a module (for example, a video module) using a plurality of processors or the like, a unit (for example, a video unit) using a plurality of modules or the like, or a set (for example, a video set) obtained by further adding other functions to the unit.

For example, the present technology is also applicable to a network system configured with a plurality of apparatuses. For example, the present technology can be carried out as cloud computing for causing a plurality of apparatuses to perform processing via a network in a sharing or cooperative fashion. For example, the present technology may be carried out in a cloud service for providing services associated with images (moving images) to any terminal such as a computer, an AV (Audio Visual) apparatus, a mobile information processing terminal, or an IoT (Internet of Things) device.

It is noted that a system means in the present specification a collection of a plurality of constituent elements (apparatuses, modules (components), and the like) regardless of whether or not all the constituent elements are provided in the same casing. Therefore, a plurality of apparatuses accommodated in separated casings and connected to one another via a network and one apparatus in which a plurality of modules is accommodated in one casing can be both referred to as "systems."

<Fields to Which the Present Technology is Applicable and Applications>

Systems, apparatuses, processing sections and the like to which the present technology is applied can be used in any field, for example, a field of transportation, medicine, crime prevention, agriculture, livestock, mining, beauty, factories, consumer electronics, weather, and nature monitoring. In addition, such systems, apparatuses, processing sections and the like can be used in any application.

For example, the present technology is applicable to a system or a device used for providing listening and viewing contents and the like. In addition, the present technology is applicable to, for example, a system or a device used for transportation such as monitoring of a traffic situation and autonomous driving control. Moreover, the present technology is applicable to, for example, a system or a device used for security. Furthermore, the present technology is applicable to, for example, a system or a device used for automatic control over machines and the like. Moreover, the present technology is applicable to, for example, a system or a device used for agriculture and livestock businesses. Further, the present technology is applicable to, for example, a system or a device for monitoring states of nature such as volcanos, forests, and oceans, wildlife, and the like. Moreover, the present technology is applicable to, for example, a system or a device used for sports.

<Others>

It is noted that in the present specification, a "flag" is information for identifying a plurality of states and includes not only information for use at a time of identifying two states of true (1) and false (0) but also information capable of identifying three or more states. Therefore, a value on which the "flag" possibly takes may be binary such as 1 or 0 or may be three or more valued. In other words, the number of bits configuring the "flag" may be any number and may be one or may be two or more. Furthermore, not only a form of containing identification information (including the flag) in a bit stream but also a form of containing difference information regarding identification information with respect to information that forms a certain basis in the bit stream is supposed; thus, in the present specification, the "flag" or the "identification information" encompasses not only the information but also the difference information with respect to the information that forms the basis.

Furthermore, various kinds of information (such as metadata) related to encoded data (bit stream) may be transmitted or recorded in any form as long as the various kinds of information is associated with the encoded data. A term "associate" means herein, for example, to allow the other data to be used (linked) at a time of processing one data. In other words, data associated with each other may be compiled as one data or individual pieces of data. For example, information associated with the encoded data (image) may be transmitted on a transmission line different from a transmission line used to transmit the encoded data (image). Furthermore, the information associated with the encoded data (image) may be recorded, for example, in a recording medium different from a recording medium in which the encoded data (image) is recorded (or in a different recording area in the same recording medium). It is noted that the "association" may not be association of overall data but may be association of part of data. For example, an image and information corresponding to the image may be associated with each other in any unit such as a plurality of frames, one frame, or a portion in a frame.

It is noted that in the present specification, terms such as "combine," "multiplex," "add," "integrate," "contain/include," "store," "incorporate," "plug," and "insert" mean to compile a plurality of things into one, for example, to compile the encoded data and the metadata into one data, and means one method for "associate" described above.

Moreover, the embodiments of the present technology are not limited to the embodiments described above and various changes can be made without departing from the spirit of the present technology.

For example, a configuration described as one apparatus (or one processing section) may be divided and configured as a plurality of apparatuses (or processing sections). Conversely, configurations described above as a plurality of apparatuses (or processing sections) may be compiled and configured as one apparatus (or one processing section). Moreover, needless to say, a configuration other than that of each apparatus (or each processing section) described above may be added to the configuration of each apparatus (or each processing section). Furthermore, if the configurations or operations are substantially identical as an overall system, part of configurations of a certain apparatus (or certain processing section) may be included in the configurations of the other apparatus (or other processing section).

Furthermore, the program described above can be executed by, for example, any apparatus. In that case, the apparatus may be configured with necessary functions (functional blocks or the like) to be capable of obtaining necessary information.

Furthermore, each step in one flowchart can be, for example, executed by one apparatus or executed by a plurality of apparatuses in a sharing fashion. Moreover, in a case in which one step includes a plurality of types of processing, the plurality of types of processing may be executed by one apparatus or executed by a plurality of apparatuses in a sharing fashion. In other words, the plurality of types of processing included in the one step can be executed as processing of a plurality of steps. Conversely, processing described as a plurality of steps may be compiled into one step and executed collectively.

Furthermore, the program executed by the computer may be configured, for example, such that a series of processing in steps that describe the program is executed in time series in an order described in the present specification or executed individually either in parallel or at necessary timing such as timing of calling. In other words, the series of processing in the steps may be executed in an order different from the order described above unless contradiction arises. Furthermore, the processing in the steps that describe the program may be executed in parallel to processing of the other program or may be executed in combination with the processing of the other program.

Furthermore, a plurality of present technologies related to the present technology can be carried out independently and solely unless contradiction arises. Needless to say, a plurality of any present technologies can be carried out in combination. For example, part of or entirety of the present technology described in any of the embodiments may be combined with part of or entirety of the present technology described in another embodiment and the combination can be carried out. Furthermore, part of or entirety of any present technology described above can be combined with other technologies that are not described above and the combination of the technologies can be carried out.

It is noted that the present technology can be configured as follows.

(1) An information processing apparatus including:
a rendering section that performs rendering on voxel data that includes 3D data obtained by quantizing position information using voxels and representing a three-dimensional structure in response to a shape of each of the voxels.

(2) The information processing apparatus according to (1), in which
the rendering section performs the rendering in such a manner that a rendered image is inscribed in each of the voxels.

(3) The information processing apparatus according to (1) or (2), further including:
a shape determination section that determines the shape of each of the voxels, in which
the rendering section performs the rendering in response to the shape of each of the voxels determined by the shape determination section.

(4) The information processing apparatus according to (3), in which
the shape determination section determines the shape of each of the voxels on the basis of the number of splits common to three axes of a bounding box normalizing the 3D data.

(5) The information processing apparatus according to (3) or (4), in which
the shape determination section determines the shape of each of the voxels on the basis of the number of splits corresponding to each axis of a bounding box normalizing the 3D data.

(6) The information processing apparatus according to (3) or (4), in which
the shape determination section determines the shape of each of the voxels on the basis of information indicating nonlinear splitting of a bounding box normalizing the 3D data.

(7) The information processing apparatus according to any one of (1) to (6), further including:
a decoding section that decodes encoded data regarding the voxel data, in which
the rendering section performs the rendering on the voxel data obtained by decoding the encoded data by the decoding section in response to the shape of each of the voxels.

(8) The information processing apparatus according to any one of (1) to (7), further including:
a display section that displays an image generated by the rendering performed by the rendering section.

(9) The information processing apparatus according to any one of (1) to (8), in which
the 3D data includes a point cloud.

(10) An information processing method including:
performing rendering on voxel data that includes 3D data obtained by quantizing position information using voxels and representing a three-dimensional structure in response to a shape of each of the voxels.

(11) An information processing apparatus including:
a bit stream generation section that generates a bit stream containing encoded data regarding voxel data that includes 3D data obtained by quantizing position information using voxels and representing a three-dimensional structure and rendering information that includes information related to rendering of the voxel data.

(12) The information processing apparatus according to (11), in which the rendering information contains voxel shape information that includes information related to a shape of each of the voxels.

(13) The information processing apparatus according to (12), in which the voxel shape information contains information indicating an aspect ratio of each of the voxels.

(14) The information processing apparatus according to (12) or (13), in which the voxel shape information contains information indicating a size of each of the voxels.

(15) The information processing apparatus according to any one of (11) to (14), in which the rendering information contains information indicating an aspect ratio of a rendering range.

(16) The information processing apparatus according to any one of (11) to (15), in which the rendering information contains information indicating a shape of a rendering range.

(17) The information processing apparatus according to any one of (11) to (16), in which the rendering information contains information indicating the number of points to be rendered.

(18) The information processing apparatus according to any one of (11) to (17), further including:

a rendering information generation section that generates the rendering information, in which the bit stream generation section is configured to generate a bit stream containing the rendering information generated by the rendering information generation section.

(19) The information processing apparatus according to (18), further including:

a rendering method setting section that sets a method of the rendering, in which the rendering information generation section is configured to generate the rendering information corresponding to the method of the rendering set by the rendering method setting section.

(20) The information processing apparatus according to (18) or (19), further including:

a voxel setting section that sets the voxels for quantizing the position information with respect to the 3D data, in which the rendering information generation section is configured to generate the rendering information corresponding to a shape of each of the voxels set by the voxel setting section.

(21) The information processing apparatus according to (20), further including:

a position quantization section that generates the voxel data by quantizing the position information regarding the 3D data using the voxels set by the voxel setting section, in which the bit stream generation section is configured to generate the bit stream containing encoded data regarding the voxel data generated by the position quantization section.

(22) The information processing apparatus according to (20) or (21), further including:

a bounding box setting section that sets a bounding box normalizing the position information with respect to the 3D data, in which the voxel setting section is configured to set the voxels for quantizing the position information with reference to the bounding box set by the bounding box setting section.

(23) The information processing apparatus according to any one of (11) to (22), further including:

an encoding section that encodes the voxel data to generate the encoded data, in which the bit stream generation section is configured to generate the bit stream containing the encoded data generated by the encoding section.

(24) The information processing apparatus according to any one of (11) to (23), in which the 3D data includes a point cloud.

(25) An information processing method including:

generating a bit stream containing encoded data regarding voxel data that includes 3D data obtained by quantizing position information using voxels and representing a three-dimensional structure and rendering information that includes information related to rendering of the voxel data.

(31) An information processing apparatus including:

a rendering section that performs rendering on voxel data that includes 3D data obtained by quantizing position information using voxels and representing a three-dimensional structure on the basis of rendering information that includes information related to the rendering of the voxel data.

(32) The information processing apparatus according to (31), in which the rendering information contains voxel shape information that includes information related to a shape of each of the voxels, and the rendering section is configured to perform the rendering on the basis of the voxel shape information.

(33) The information processing apparatus according to (32), in which the voxel shape information contains information indicating an aspect ratio of each of the voxels, and the rendering section performs the rendering on the basis of the aspect ratio of each of the voxels indicated by the information.

(34) The information processing apparatus according to (32) or (33), in which the voxel shape information contains information indicating a size of each of the voxels, and the rendering section performs the rendering on the basis of the size of each of the voxels indicated by the information.

(35) The information processing apparatus according to any one of (31) to (34), in which the rendering information contains information indicating an aspect ratio of a rendering range, and the rendering section performs the rendering in response to the aspect ratio of the rendering range indicated by the information.

(36) The information processing apparatus according to any one of (31) to (35), in which the rendering information contains information indicating a shape a rendering range, and the rendering section performs the rendering in response to the shape of the rendering range indicated by the information.

(37) The information processing apparatus according to any one of (31) to (36), in which the rendering information contains information indicating the number of points to be rendered, and the rendering section performs the rendering by as many number of points as indicated by the information.

(38) The information processing apparatus according to any one of (31) to (37), further including:

a decoding section that decodes encoded data regarding the voxel data, in which the rendering section performs the rendering on the voxel data obtained by decoding the encoded data by the decoding section.

(39) The information processing apparatus according to (38), in which the decoding section decodes the encoded data contained in a bit stream, and the rendering section performs the rendering on the voxel data obtained by decoding the encoded data by the decoding section on the basis of the rendering information contained in the bit stream.

(40) The information processing apparatus according to any one of (31) to (39), further including:

a shape determination section that determines a shape of each of the voxels on the basis of the rendering information, in which the rendering section performs the rendering in response to the rendering information and the shape of each of the voxels determined by the shape determination section.

(41) The information processing apparatus according to any one of (31) to (40), further including:

a display section that displays an image generated by the rendering performed by the rendering section.

(42) The information processing apparatus according to any one of (31) to (41), in which the 3D data includes a point cloud.

(43) An information processing method including:

performing rendering on voxel data that includes 3D data obtained by quantizing position information using voxels and representing a three-dimensional structure on the basis of rendering information that includes information related to the rendering of the voxel data.

REFERENCE SIGNS LIST

100 Encoding apparatus, 101 Control section, 111 Preprocessing section, 112 BB setting section, 113 Voxelization section, 114 Octree encoding section, 115 Signal sequence encoding section, 200 Decoding apparatus, 201 Control section, 211 Signal sequence decoding section, 212 Octree decoding section, 213 Voxel shape determination section, 214 Rendering section, 215 Display control section, 216 Display section, 300 Encoding apparatus, 311 Preprocessing section, 312 BB setting section, 313 Voxelization section, 314 Information extraction section, 315 Octree encoding section, 316 Encoding signal sequence, 317 Association section, 341 Voxel setting section, 342 Distribution information generation section, 343 Rendering method setting section, 344 Position quantization section, 400 Decoding apparatus, 411 Signal sequence decoding section, 412 Octree decoding section, 413 Voxel shape determination section, 414 Rendering section, 415 Display control section, 416 Display section

The invention claimed is:

1. A decoding apparatus, comprising:
circuitry configured to:
acquire rendering information of voxel data based on quantization of plural-points position information that represents a plurality of points within a single voxel to single-point position information that represents a single point within the single voxel, wherein the rendering information includes distribution information corresponding to the plurality of points; and
render a reconstructed plurality of points within a reconstructed single voxel based on the distribution information.

2. The decoding apparatus according to claim 1, wherein the circuitry is further configured to render the reconstructed plurality of points to be inscribed to the reconstructed single voxel.

3. The decoding apparatus according to claim 1, wherein the circuitry is further configured to:
determine a shape of the reconstructed single voxel; and
render the reconstructed single voxel based on the shape of the reconstructed single voxel.

4. The decoding apparatus according to claim 3, wherein the circuitry is further configured to determine the shape of the reconstructed single voxel based on a number of splits common to three axes of a bounding box that normalizes 3D data.

5. The decoding apparatus according to claim 3, wherein the circuitry is further configured to determine the shape of the reconstructed single voxel based on a number of splits corresponding to each axis of a bounding box that normalizes 3D data.

6. The decoding apparatus according to claim 3, wherein the circuitry is further configured to determine the shape of the reconstructed single voxel based on information indicating nonlinear splitting of a bounding box that normalizes 3D data.

7. A decoding method, comprising:
acquiring rendering information of voxel data based on quantization of plural-points position information that represents a plurality of points within a single voxel to single-point position information that represents a single point within the single voxel, wherein the rendering information includes distribution information corresponding to the plurality of points; and
rendering a reconstructed plurality of points within a reconstructed single voxel based on the distribution information.

8. A decoding apparatus, comprising:
circuitry configured to:
generate a bit stream containing rendering information of voxel data based on quantization of plural-points position information that represents a plurality of points within a single voxel wherein the rendering information includes distribution information corresponding to the plurality of points; and
render a reconstructed plurality of points within a reconstructed single voxel based on the distribution information.

9. The decoding apparatus according to claim 8, wherein the rendering information includes voxel shape information that includes first information related to a shape of the reconstructed single voxel.

10. The decoding apparatus according to claim 9, wherein the voxel shape information includes second information that indicates an aspect ratio of the reconstructed single voxel.

11. The decoding apparatus according to claim 9, wherein the voxel shape information includes second information that indicates a size of the reconstructed single voxel.

12. The decoding apparatus according to claim 8, wherein the rendering information includes information that indicates an aspect ratio of a rendering range.

13. The decoding apparatus according to claim 8, wherein the rendering information includes information that indicates a shape of a rendering range.

14. The decoding apparatus according to claim 8, wherein the rendering information includes information that indicates a number of points to be rendered.

15. The decoding apparatus according to claim 8, wherein the circuitry is further configured to:
set a method of rendering; and
generate the rendering information corresponding to the set method of the rendering.

16. A decoding method, comprising:
generating a bit stream containing rendering information of voxel data based on quantization of plural-points position information that represents a plurality of points within a single voxel to a single-point position information that represents a single point within the single voxel, wherein the rendering information includes distribution information corresponding to the plurality of points; and
rendering a reconstructed plurality of points within a reconstructed single voxel based on the distribution information.

17. A decoding apparatus, comprising:
circuitry configured to:
acquire rendering information of voxel data based on quantization of plural-points position information that represents a plurality of points within a single voxel to single-point position information that represents a single point within the single voxel; and
render a reconstructed plurality of points within a reconstructed single voxel based on the rendering information.

18. The decoding apparatus, according to claim 17, wherein the circuitry is further configured to:
determine a shape of the reconstructed single voxel based the rendering information; and
render the reconstruction plurality of points based on the rendering information and the shape of the reconstructed single voxel.

19. A decoding method, comprising:
acquiring rendering information on voxel data based on quantization of plural-points position information that represents a plurality of points within a single voxel to single-point position information that represents a single point within the single voxel; and
rendering a reconstructed plurality of points within a reconstructed single voxel based on the rendering information.

* * * * *